US006426977B1

(12) United States Patent
Lee et al.

(10) Patent No.: US 6,426,977 B1
(45) Date of Patent: Jul. 30, 2002

(54) SYSTEM AND METHOD FOR APPLYING AND REMOVING GAUSSIAN COVERING FUNCTIONS

(75) Inventors: Harry B. Lee, College Park, MD (US); Theodore Bially, Sudbury, MA (US); Jerry R. Hampton, Bowie, MD (US); David L. Nicholson, Herndon, VA (US)

(73) Assignee: Atlantic Aerospace Electronics Corporation, Greenbelt, MD (US)

( * ) Notice: Subject to any disclaimer, the term of this patent is extended or adjusted under 35 U.S.C. 154(b) by 0 days.

(21) Appl. No.: 09/325,539

(22) Filed: Jun. 4, 1999

(51) Int. Cl.[7] .............................................. H04L 27/00

(52) U.S. Cl. ..................................................... 375/259

(58) Field of Search ................................ 375/259, 229, 375/349, 350; 704/220

(56) References Cited

U.S. PATENT DOCUMENTS

| | | | | |
|---|---|---|---|---|
| 4,300,161 A | * 11/1981 | Haskell | ................... | 348/385.1 |
| 4,597,107 A | 6/1986 | Ready | | |
| 4,852,166 A | 7/1989 | Masson | | |
| 5,103,459 A | 4/1992 | Gilhousen et al. | | |
| 5,596,609 A | * 1/1997 | Genrich et al. | ............. | 375/350 |
| 5,694,419 A | * 12/1997 | Lawrence et al. | .......... | 327/555 |
| 5,937,009 A | * 8/1999 | Wong et al. | ................ | 370/286 |

FOREIGN PATENT DOCUMENTS

| | | |
|---|---|---|
| EP | 0 378 446 A3 | 7/1990 |
| WO | WO 98/40970 | 9/1998 |

OTHER PUBLICATIONS

Ma et al, "Wavelet transform–based analogue speech scrambling scheme," Electronics Letters, Apr. 11, 1996, vol. 32, No. 8, pp. 719–721.

Min et al, "A Periodically Time Varying Digital Filter Containing an Inverse Discrete Fourier Transformer and Its Application To The Spectrum Scrambling," IECON'90, 16th Annual Conference of IEEE Industrial Electronics Society, vol. I, Nov. 27–30, 1990, Pacific Grove, California, pp. 256–261.

Reed et al, "Spread Spectrum Signals with Low Probability of Chip Rate Detection," I.E.E.E. Journal on Selected Areas in Commun. (1989) May, No. 4, New York, NY, US, pp. 595–601.

P.P. Vaidyanathan, "Robust Digital Filter Structures," Handbook for Digital Signal Processing, ed. by Mitra and Kaiser, chapter 7, Wiley, 1993, pp. 419–491.

P.P. Vaidyanathan, "Paraunitary Perfect Reconstruction (PR) Filter Banks," Multirate Systems and Filter Banks, chapter 6, Prentice–Hall, 1993, pp. 296–336.

P.P. Vaidyanathan, "Paraunitary and Lossless Systems," Multirate Systems and Filter Banks, chapter 14, Prentice–Hall, 1993, pp. 722–781.

(List continued on next page.)

*Primary Examiner*—Don N. Vo
(74) *Attorney, Agent, or Firm*—Pillsbury Winthrop LLP

(57) ABSTRACT

A novel method and apparatus encodes a data signal (e.g., before wireless transmission) such that the encoded signal has Gaussian statistics and the transmitted signal exhibits virtually no signal structure. This approach represents a significant improvement over previous attempts, as no synchronization between the encoder and decoder is required and the linearity of the transfer channel is preserved. Implementations of systems, methods, and apparatus according to embodiments of the invention are disclosed wherein the encoded signal has a flat power spectrum, wherein different codes are assigned to different users, wherein compensation for phase shifts is performed, and wherein the design and/or construction of the implementation may be accomplished using various digital filtering architectures.

47 Claims, 20 Drawing Sheets

OTHER PUBLICATIONS

Martin Vetterli and Jelena Kovacevic, "Discrete–Time Bases and Filter Banks," Wavelets and Subband Coding, chapter 3, Prentice Hall, 1995, pp. 92–195 and 461–479.

Augustine H. Gray, Jr. and John D. Markel, "A normalized digital filter structure," IEEE Transactions on Acoustics, Speech, and Signal Processing, vol. ASSP–23, No. 3, Jun. 1975, pp. 268–277.

S.K. Mitra and K. Hirano, "Digital all–pass networks," IEEE Transactions on Circuits and Systems, vol. CAS–21, No. 5, Sep. 1974, pp. 688–700.

Augustine H. Gray, Jr., "Passive cascaded lattice digital filters," IEEE Transactions on Circuits and Systems, vol. CAS–27, No. 5, May 1980, pp. 337–344.

Sailesh K. Rao and Thomas Kailath, "Orthogonal digital filters for VLSI implementation," IEEE Transactions on Circuits and Systems, vol. CAS–31, No. 11, Nov. 1984, pp. 933–945.

P.P. Vaidyanathan, "The doubly terminated lossless digital two–pair in digital filtering," IEEE Transactions on Circuits and Systems, vol. CAS–32, No. 2, Feb. 1985, pp. 197–200.

P.P. Vaidyanathan, "A general theorem for degree–reduction of a digital BR function," IEEE Transactions on Circuits and Systems, vol. CAS–32, No. 4, Apr. 1985, pp. 414–415.

P.P. Vaidyanathan, "A unified approach to orthogonal digital filters and wave digital filters, based on LBR two–pair extraction," IEEE Transactions on Circuits and Systems, vol. CAS–32, No. 7, Jul. 1985, pp. 673–686.

P.P. Vaidyanathan, "The discrete–time bounded–real lemma in digital filtering," IEEE Transactions on Circuits and Systems, vol. CAS–32, No. 9, Sep. 1985, pp. 918–924.

P.P. Vaidyanathan, "On power–complementary FIR filters," IEEE Transactions on Circuits and Systems, vol. CAS–32, No. 12, Dec. 1985, pp. 1308–1310.

Tapio Saramaki, "On the design of digital filters as a sum of two all–pass filters," IEEE Transactions on Circuits and Systems, vol. CAS–32, No. 11, Nov. 1985, pp. 1191–1193.

P.P. Vaidyanathan et al., "A new approach to the realization of low–sensitivity IIR digital filters," IEEE Transactions on Acoustics, Speech, and Signal Processing, vol. ASSP–34, No. 2, Apr. 1986, pp. 350–361.

P.P. Vaidyanathan, "Passive cascaded–lattice structures for low–sensitivity FIR filter design, with applications to filter banks," IEEE Transactions on Circuits and Systems, vol. CAS–33, No. 11, Nov. 1986, pp. 1045–1064.

Mark J. T. Smith and Thomas P. Barnwell, III, "A new filter bank theory for time–frequency representation," IEEE Transactions on Acoustics, Speech, and Signal Proessing, vol. ASSP–35, No. 3, Mar. 1987, pp. 314–327.

P.P. Vaidyanathan, "Theory and design of M–channel maximally decimated quadrature mirror filters with arbitrary M, having the perfect–reconstruction property," IEEE Transactions on Acoustics, Speech, and Signal Processing, vol. ASSP–35, No. 4, Apr. 1987, pp. 476–492.

P.P. Vaidyanathan, Phillip A. Regalia, and Sanjit K. Mitra, "Design of doubly–complementary IIR digital filters using a single complex allpass filter, with multirate applications," IEEE Transactions on Circuits and Systems, vol. CAS–34, No. 4, Apr. 1987, pp. 378–389.

P.P. Vaidyanathan, "Quadrature mirror filter banks, M–band extensions and perfect–reconstruction techniques," IEEE ASSP Magazine, Jul. 1987, pp. 4–20.

P.P. Vaidyanathan and Phuong–Quan Hoang, "Lattice structures for optimal design and robust implementation of two–channel perfect–reconstruction QMF banks," IEEE Transactions on Acoustics, Speech, and Signal Processing, vol. 36, No. 1, Jan. 1988, pp. 81–94.

Truong Q. Nguyen and P.P. Vaidyanathan, "Maximally decimated perfect–reconstruction FIR filter banks with pairwise mirror–image analysis (and synthesis) frequency responses," IEEE Transactions on Acoustics, Speech, and Signal Processing, vol. 36, No. 5, May 1988, pp. 693–705.

Jacques Szczupak, Sanjit K. Mitra, and Jalil Fadavi–Ardekani, "A computer–based synthesis method of structurally LBR digital all pass networks," IEEE Transactions on Circuits and Systems, vol. 35, No. 6, Jun. 1988, pp. 755–760.

Zinnur Doganata, P.P. Vaidyanathan, and Truong Q. Nguyen, "General synthesis procedures for FIR lossless transfer matrices, for perfect–reconstruction multirate filter bank applications," IEEE Transactions on Acoustics, Speech, and Signal Processing, vol. 36, No. 10, Oct. 1988, pp. 1561–1574.

Robert A. Scholtz, "The origins of spread–spectrum communications," IEEE Transactions on Communications, vol. COM–30, No. 5, May 1982, pp. 822–854.

Raymond L. Pickholtz, Donald L. Schilling, and Laurence B. Milstein, "Theory of spread–spectrum communications—a tutorial," IEEE Transactions on Communications, vol. Com–30, No. 5, May 1982, pp. 855–884.

David L. Nicholson, "Design of spread spectrum signals against linear intercept receivers," Spread Spectrum Signal Design–LPE and AJ Systems, Computer Science Press, 1988, Chapter 3, pp. 91–153.

David L. Nicholson, "Design of spread spectrum signals against nonlinear intercept receivers," Spread Spectrum Signal Design–LPE and AJ Systems, Computer Science Press, 1988, Chapter 4, pp. 155–187.

Dr. William A. Gardner, "Introduction to second–order periodicity," Statistical Spectral Analysis—A Nonprobabilistic Theory, Prentice–Hall, 1988, Chapter 10, pp. 355–383.

Dr. William A. Gardner, "Cyclic spectral analysis," Statistical Spectral Analysis—A Nonprobabilistic Theory, Prentice–Hall, 1988, Chapter 11, pp. 384–418.

Dr. William A. Gardner, "Examples of cyclic spectra," Statistical Spectral Analysis—A Nonprobabilistic Theory, Prentice–Hall, 1988, Chapter 12, pp. 419–462.

David L. Nicholson, "Cyclostationary Signal Processing," Continuing Engineering Education Program at The George Washington University, Washington, DC, Jun. 1992, Course 1650.

William A. Gardner, "Signal interception: a unifying theoretical framework for feature detection," IEEE Transactions on Communications, vol. 36, No. 8, Aug. 1988, pp. 897–906.

William A. Gardner and Chad M. Spooner, "Signal interception: performance advantages of cyclic–feature detectors," IEEE Transactions on Communications, vol. 40, No. 1, Jan. 1992, pp. 149–159.

Jean–Claude Imbeaux, "Performance of the delay–line multiplier circuit for clock and carrier synchronization in digital satellite communications," IEEE Journal On Selected Areas In Communications, vol. SAC–1, No. 1, Jan. 1983, pp. 82–95.
John F. Kuehls and Evaggelos Geraniotis, "Presence detection of binary–phase–shift–keyed and direct–sequence spread–spectrum signals using a prefilter–delay–and–multiply device," IEEE Journal on Selected Areas in Communications, vol. 8, No. 5, Jun. 1990, pp. 915–933.
D.E. Reed and M.A. Wickert, "Minimization of detection of symbol–rate spectral lines by delay and multiply receivers," IEEE Transactions on Communications, vol. 36, No. 1, Jan. 1988, pp. 118–120.
Alexander Sonnenschein and Philip M. Fishman, "Limitations on the detectability of spread–spectrum signals," Proceedings of IEEE MILCOM Conference, Paper 19.6.1, 1989, pp. 364–369.

* cited by examiner

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 1 | -1 | -1 | -1 | 1 | -1 | -1 | -1 | -1 | 1 | -1 | -1 | 1 | -1 | -1 | -1 | -1 | 1 | 1 | 1 | -1 | 1 | -1 | -1 | -1 | 1 | -1 | -1 | 1 | -1 |
| -1 | -1 | -1 | 1 | 1 | 1 | -1 | 1 | -1 | -1 | -1 | 1 | -1 | -1 | 1 | -1 | 1 | 1 | 1 | -1 | -1 | -1 | 1 | -1 | -1 | -1 | -1 | 1 | -1 | -1 | 1 | -1 |
| -1 | -1 | -1 | 1 | -1 | -1 | 1 | -1 | 1 | 1 | 1 | -1 | -1 | -1 | 1 | -1 | -1 | -1 | -1 | 1 | -1 | -1 | 1 | -1 | +1 | -1 | 1 | 1 | 1 | -1 | 1 |
| -1 | -1 | -1 | 1 | -1 | -1 | 1 | -1 | -1 | -1 | -1 | 1 | 1 | 1 | -1 | 1 | -1 | -1 | -1 | 1 | -1 | -1 | 1 | -1 | 1 | 1 | 1 | -1 | -1 | -1 | 1 | -1 |
| -1 | -1 | 1 | -1 | 1 | 1 | 1 | -1 | -1 | -1 | 1 | -1 | -1 | -1 | -1 | 1 | 1 | 1 | -1 | 1 | -1 | -1 | -1 | 1 | -1 | -1 | 1 | -1 | -1 | -1 | -1 | 1 |

| Row | 1 | 3 | 5 | 7 | 9 | 11 | 13 | 15 |
|---|---|---|---|---|---|---|---|---|
| 1 | $\pi/4$ | $3\pi/4$ | $\pi$ | $3\pi/4$ | 0 | 0 | $\pi$ | $3\pi/4$ |
| 2 | $\pi/4$ | $3\pi/4$ | $\pi$ | $3\pi/4$ | 0 | 0 | 0 | $\pi/4$ |
| 3 | $\pi/4$ | $3\pi/4$ | 0 | $\pi/4$ | 0 | 0 | 0 | $\pi/4$ |
| 4 | $\pi/4$ | $3\pi/4$ | 0 | $\pi/4$ | 0 | 0 | $\pi$ | $3\pi/4$ |
| 5 | $\pi/4$ | $\pi/4$ | 0 | $\pi/4$ | 0 | 0 | $\pi$ | $3\pi/4$ |

| Row | 17 | 19 | 21 | 23 | 25 | 27 | 29 | 31 |
|---|---|---|---|---|---|---|---|---|
| 1 | 0 | 0 | 0 | 0 | 0 | 0 | $\pi$ | $3\pi/4$ |
| 2 | 0 | 0 | 0 | 0 | 0 | 0 | $\pi$ | $\pi/4$ |
| 3 | 0 | 0 | 0 | 0 | 0 | 0 | 0 | $3\pi/4$ |
| 4 | 0 | 0 | 0 | 0 | 0 | 0 | $\pi$ | $\pi/4$ |
| 5 | 0 | 0 | 0 | 0 | 0 | 0 | 0 | $3\pi/4$ |

FIG. 9C

SYSTEM AND METHOD FOR APPLYING AND REMOVING GAUSSIAN COVERING FUNCTIONS

BACKGROUND OF THE INVENTION

1. Field of the Invention

This invention relates to structures and algorithms for generating and receiving signals for communications, surveillance, and navigation.

2. Description of Related Art and General Background

Applications for Noise-like Signal

In certain wireless communications, surveillance, and navigation (CSN) applications, it is desirable to transmit a signal such that an unintended recipient would perceive the signal as no more than background noise (as discussed in references SD1–SD3, which documents are hereby incorporated by reference). One such application is covert communications systems, wherein a signal disguised as noise becomes harder for a curious interloper to detect. Such signals are said to exhibit a 'low probability of detection' (LPD). Another such application is multiple access systems, wherein it is theorized that the interference caused by other users' signals would be reduced by making the signals more noise-like.

Transmit Issues

In covert communications systems, the object is to communicate in such a manner that an unfriendly party will be unable to detect the presence of the communications signal. While low power techniques for such communications exist, they involve an obvious and unavoidable tradeoff between evading detection and maintaining a robust communications link. Conventional direct sequence spread spectrum (DSSS) techniques spread the bandwidth of digital data signals over a wide frequency band by modulating them with a binary pseudonoise (PN) spreading sequence. Although the power spectral density of such a signal may be below the noise floor, the binary structure of a DSSS signal makes it vulnerable to detection, e.g., by cyclostationary signal processing techniques (as discussed in references SD1–SD3, incorporated by reference above, and SD4–SD12, which documents are hereby incorporated by reference).

Receive Issues

Rake combining is one technique that has proven to be particularly important to effective communications in restrictive environments, such as high-density urban areas, and also in dynamic scenarios (e.g. communications in the presence of moving vehicles). Due to the presence of multiple reflecting objects, a transmitted signal arrives at a receiver not only via a direct line-of-sight path, but also via multiple indirect paths. The latter so-called multipath signals are delayed and attenuated replicas of the direct signal. An important attribute of DSSS techniques is based on the fact that the spreading sequences are chosen to have autocorrelation functions that approach delta functions (i.e. impulses). Therefore, individual multipath instances of the originally transmitted signal within a received signal may reliably be located and tracked in time. This tracking capacity allows the energy from several multipath instances of the same transmitted signal to be extracted from the received signal, time-aligned, and combined coherently, thereby significantly improving the signal-to-noise ratio. (In contrast, multipath interference is extremely difficult to remove from non-DSSS communications signals and can render them undecipherable.) Rake receivers are commonly used to implement these tracking and combining functions in DSSS systems and are well understood by those of ordinary skill in the art (as discussed in reference B.9, which document is hereby incorporated by reference).

Characteristics of Noise

Background noise has a character which may change according to the particular environment in which a receiver is operating, but one component which is always present is receiver thermal noise. Such noise typically has white Gaussian statistics, in that the values of any set of samples taken from a segment of thermal noise will tend to have a normal distribution. Additionally white Gaussian noise has the following properties:

P1) Auto-correlation functions with no sidelobes

P2) Flat spectra

P3) No correlation with delayed replicas

P4) Real and imaginary parts of signal uncorrelated for all reference phases.

In order to make a communications signal look like noise and thereby blend into the thermal noise ensemble, it is desirable to design the signal to have the foregoing properties. Signals with Gaussian statistics also provide protection against some forms of advanced cyclostationary signal detection receivers (as discussed in references SD4–SD19). One way to produce a signal having Gaussian statistics from a binary-valued input is through the use of a matched pair of covering and uncovering modules. The covering module, which is located in the transmitter, acts to transform the highly detectable binary input sequences into a highly noise-like sequence (at the same sample rate) which is then smoothed, up-converted, and transmitted. The uncovering module, which is located in the receiver, reverses the transformation and converts the sampled noise-like signal into a useful approximation of the input sequence.

Conventional Block-based Techniques

Most conventional implementations of covering/uncovering module pairs are block-based, in that each block of input data is covered, transmitted, and uncovered as a discrete unit. Examples include fixed-length transform techniques such as the Fourier and discrete wavelet transform approaches (as discussed in references SD15–SD19). If the block size is sufficiently large and the distribution of the input data is sufficiently random, many such methods may produce an output having Gaussian statistics. However, care must be exercised in order to ensure that the block edges do not create a periodic feature detectable by cyclostationary detectors (as discussed in references SD4–D11). An additional vulnerability of the Fourier transform approach is that it is a known fixed-length transform that may readily be replicated by a curious interloper attempting to uncover the underlying binary signal.

Block-based covering/uncovering modules severely impact two significant receiver requirements: 1) the need for synchronization, and 2) the need to degrade as little as possible the performance of receiver rake-combining operations. For example, one conventional block-based method synthesizes the spectrum of the output signal directly from the input baseband data and then uses a discrete inverse Fourier transform to generate the corresponding block of time-domain coefficients for transmission. In this approach, the input block to the covering module represents the desired output spectrum and the output block of the covering module represents the complex values of the corresponding time-domain coefficients. The discrete direct Fourier transform which serves as the uncovering applique, however, is not shift invariant: the particular time index with which each received coefficient is associated depends on the coefficient's place within the received block. If the receiver applies the wrong block boundaries to the received signal, the received time coefficients will become associated with the wrong time indices. In this case the result of decoding the signal will not be merely a shifted version of the transmitted data; rather, it may not resemble the transmitted data at all. Therefore, it is necessary for the pair of covering/uncovering modules to observe exactly the same block boundaries.

One way to ensure that both covering and uncovering modules adhere to the same boundary convention is for the operations of the covering and uncovering modules to be synchronized in time. Each module could utilize a local clock for this purpose, but unavoidable variations between the clocks' frequencies would soon destroy any initial condition of synchronization between them. Unfortunately, it is also typically impossible to reliably synchronize the transmitter and receiver to a time reference outside the communications channel (i.e. within a transmitted reference channel), because changes in the environment and/or the relative positions of the transmitter, receiver, and time reference will induce unequal phase shifts in the synchronization and communications channels and thereby alter the required correspondence between them. Therefore, the necessary synchronization must be accomplished utilizing signals transmitted within the communications channel itself. This synchronization requirement places a significant added processing burden on the uncovering module and/or downstream receiver processing sections.

Various methods have been devised for achieving synchronization. These include carrier recovery loops (such as phase-locked and Costas loops), early-late gate tracking, and tau-dither tracking, among others known to those of ordinary skill in the art (as discussed in reference B.8, which document is hereby incorporated by reference). The initial stage of the synchronization operation, called acquisition, may be accomplished using time-domain cross-correlation or fast correlation methods based on the fast Fourier transform (FFT). For example, one typical digital acquisition strategy involves the periodic transmission of a unique sequence of symbols, sometimes called an acquisition sequence or synchronization preamble, which is known in advance to the receiver. The receiver looks for the preamble by continuously correlating its incoming data stream against the known sequence. Receipt of the preamble, which constitutes a synchronization event, is evidenced by the appearance of a correlation spike at the receiver. Significant additional processing hardware is required for acquisition over and above that required simply to perform the uncovering operation.

An equally serious consequence for DSSS systems is that a block-based uncovering module can fragment or destroy the nonaligned multipath signal instances upon which effective rake combining depends. In the general case, therefore, a DSSS system using such an uncovering module can forfeit a principal advantage of DSSS techniques, unless the receiver includes block processing hardware that is time-aligned with each delayed component in the signal to be combined. Obviously, such replication of hardware is undesirable for any implementation using a block large enough to ensure a signal having Gaussian statistics. As a result, the system will be unable to combine energy from different instances of the same signal, particularly in dynamic scenarios, and will become susceptible to multipath interference and distortion.

SUMMARY OF THE INVENTION

A novel method and apparatus provides a way to (1) transform a structured data sequence into a sequence that appears noise-like when observed by a curious interloper and (2) transform the noise-like sequence back into a useful version of the original structured data sequence as required by the application. The method utilizes a matched pair of programmable digital-signal-processing modules: a covering module and an uncovering module. The covering module transforms each input data sequence into a noise-like sequence having the same sample rate as the input sequence. For randomized input data and a suitably designed covering module, the resultant sequence has approximately Gaussian statistics and is extremely difficult for a third-party observer to distinguish from background noise. The uncovering module reverses the transformation, converting the noise-like sequence substantially to original form. Both the covering and uncovering modules are implemented via linear time-invariant signal processing structures. Thus, neither device requires a time reference in order to perform its function properly. The implementation of the uncovering module completely obviates the troublesome synchronization requirement of conventional block processing techniques. Additionally, the principle of superposition applies to the uncovering module; therefore, this module need not impose any performance loss on downstream rake-combining operations. The embodiments described can be programmed with a large number of discrete codes to facilitate covertness, security, and multiple access.

BRIEF DESCRIPTION OF THE FIGURES

FIG. 9C shows the rotation angles used to produce the results of FIG. 9B.

DETAILED DESCRIPTION OF THE INVENTION

Figure 1:
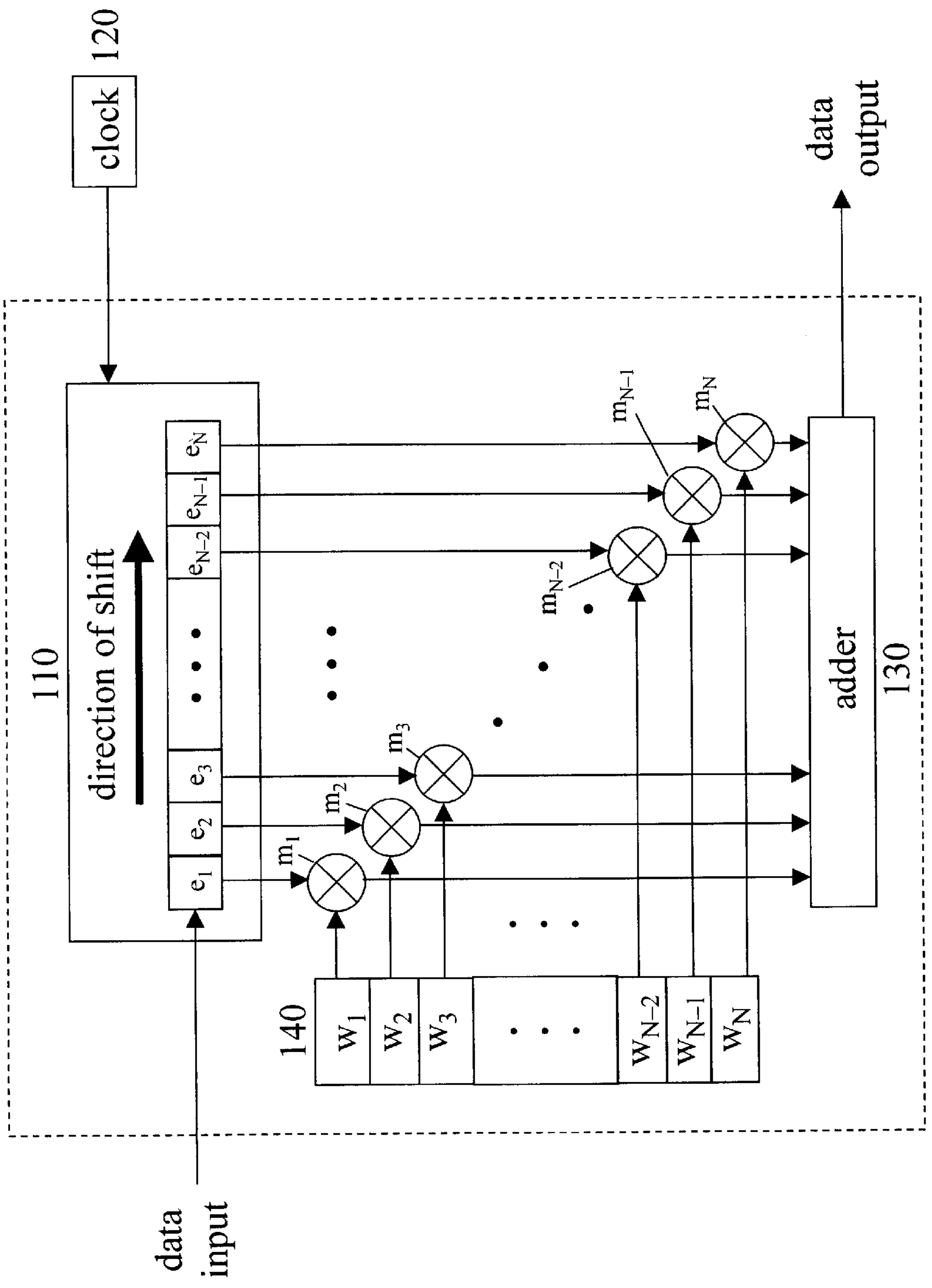
FIG. 1 is a block diagram of a basic finite impulse response (FIR) filter.

In order to more effectively hide a signal within the background noise, it is desirable to supplement existing techniques with an encoding process that will produce a featureless noise-like signal having no perceivable man-made structure (as discussed in references SD13–SD19, which documents are hereby incorporated by reference). Additionally, it is desirable for the encoded signal to have a flat power spectrum (i.e. to resemble white noise in particular) so that its presence cannot be detected even by an interloper using spectrum analyzing techniques.

In the envisioned CSN applications, the transmitter transforms a conventional DSSS signal by adding a LPD cover prior to transmission. At the receiver, this cover is removed so that downstream DSSS receiver sections can perform their functions. These functions may include DSSS synchronization, demodulation, rake combining, and signal time-of-arrival (TOA) measurement. It is desirable that the uncovering module impose negligible performance loss on these functions relative to a mode of operation in which no LPD cover is employed. For reasons discussed below, most conventional LPD covering/uncovering techniques are unable to meet this objective.

General Considerations

In general, it is desirable to have a covering/uncovering process that (1) does not add a new layer of synchronization to the communications system and (2) does not degrade rake-combining performance. One way to achieve this result is to use linear time-invariant (LTI) transformations to perform the covering and uncovering functions. Devices that implement LTI transformations process data correctly with no time reference. Thus, following cover removal, synchronization preambles are passed correctly to receiver downstream synchronization logic, without any a priori timing information. Also, superposition applies to LTI systems so that multiple delayed replicas of a direct-path signal can be processed in exactly the same manner as the direct-path signal, thereby facilitating downstream rake combining.

Additionally, it is desirable to implement the covering and uncovering functions with modules that are programmable by a large number of codes. This coding of the covering/uncovering modules is independent of, and in addition to, the digital encoding which generates the input DSSS data sequence. Large code dimensionality has several benefits, including (1) enabling the transmitter and the receiver to change codes often, and at pre-specified times, to thwart an interloper attempting to replicate/guess receiver hardware, and (2) enabling multiple-access systems, in that multiple users having different access codes can utilize the same channel at the same time with controlled mutual interference.

Finally, it may be acceptable in covert applications for the uncovering module to introduce some degree of distortion, since downstream processing typically employs processing gain that can greatly mitigate such distortion.

Basic Principles of the Invention

Linear Time-invariant Covering/uncovering Modules

Two particular features are common to systems according to the following embodiments of the invention: (1) a LTI signal processing structure and (2) a set of variable parameters that specialize the structure. Previous use of this class of structures in digital filtering applications has followed a paradigm which begins with a filter specification that satisfies system-level requirements. A designer then calculates a set of values for the filter parameters which cause the associated structure to realize, or to usefully approximate, that filter specification (as discussed in references SP.1–SP.93, which documents are hereby incorporated by reference).

In the present application, the signal processing structures are used in a much different way, in that the above paradigm is reversed. Rather than starting with design specifications and proceeding to parameter values, the paradigm here is to start with randomly selected parameter values and to end up with a processing structure useful for performing covering/uncovering functions. The parameter sets are used as codes, and the resulting structures produce highly randomized frequency responses. These frequency responses bear no resemblance to classical frequency response functions (e.g. lowpass, highpass, bandpass, band-stop or notch), in that their peaks and valleys are distributed across the entire frequency range of the sampling bandwidth of the system rather than being concentrated in one region as might be desirable in other applications.

Unlike conventional approaches that employ block-based data transformation methods, the covering/uncovering modules that provide the bases for these embodiments comprise one or more linear time-invariant (LTI) filters. All LTI filters possess the property of shift invariance. Consequently there is no need to synchronize elements at either the covering or uncovering filtering modules: if the signal is delayed during transmission, the only difference after uncovering will be a corresponding delay in the output data stream. Additionally, the linearity property of LTI filters guarantees that the superposition of multipath reflections will be preserved in a receiver having such filters in its input path. Therefore, the tracking and combining abilities of a rake receiver in a DSSS system are substantially unaffected by adding appropriately matched LTI filters at the end of the baseband channel in the transmitter and at the start of the baseband channel in the receiver. The above-mentioned and other properties of LTI filters, and methods for the design and implementation of LTI filters of both the finite impulse response (FIR) and infinite impulse response (IIR) variety, are well known to those of ordinary skill in the art (as discussed in references SP.1SP.93). These embodiments make use of LTI filters to generate output signals with special properties and may also use special methods of computationally efficient implementation.

Generation of Gaussian Statistics

LTI signal processing elements compute their outputs as a weighted sum of prior inputs (and, in some cases, prior outputs), wherein the weights are fixed (as discussed in references B.1–B.7, which documents are hereby incorporated by reference). FIG. 1 shows an example of a direct-form finite impulse response (FIR) filter that may be used to convert an input stream of data to an output stream having Gaussian statistics.

In the filter of FIG. 1, storage array 140 is preloaded with an array of multiplication coefficients or 'tap weights' $w_1, \ldots, w_N$. At each cycle of clock 120, the value in each storage element $e_1, \ldots, e_{N-1}$ of shift register 110 is shifted into the next element in the direction indicated and appears at the output of that element, and the next value of the data input is accepted into storage element $e_1$ and appears at its output. Each multiplier $m_i$ (where i is an integer from 1 to N) then performs the operation $r_i = w_i e_i$. The $r_i$ are summed in adder 130, and the output value is produced. In this manner, one input sample is consumed and one output sample is produced for each cycle of clock 120. Note that the transfer function of such a filter is determined by the array of tap weights $w_1, \ldots, w_N$.

A set of such output samples as produced by the filter of FIG. 1 over time will exhibit approximately Gaussian statistics provided that the following three conditions are satisfied: (1) that the number of storage elements in shift register 210 is sufficiently large, (2) that the input stream of data may be expressed as a collection of independent random variables, and (3) that the sequence of values represented by the tap weights $w_1, \ldots, w_N$ be sufficiently dissimilar from an impulse such that the output sample is a non-trivial function of the values in storage elements $e_1, \ldots, e_{N-1}$. When these conditions are satisfied, the desired result is obtained by virtue of the Central Limit Theorem (CLT), which states that for a sum of samples taken from a source population of independent random variables, as the number of variables in the sum becomes large the distribution of the sum approaches the normal (i.e. Gaussian) distribution, regardless of the distribution of the source population (as discussed in reference B.10, which document is hereby incorporated by reference). Note in particular that the baseband signal produced by a DSSS modulator with PN coding is well suited as an input stream for such a system, as it may generally be viewed as a collection of independent random variables. Infinite impulse response (IIR) filters are also useful for this application since they produce outputs which, as in the case of FIR filters, comprise weighted sums of past inputs. IIR filter outputs also include weighted sums of previous outputs, which contribute to their ability to generate Gaussian signal statistics.

Overview of Module Application

The signal processing structures of the following embodiments of the invention are variants of an architectural form which we refer to as dual-port linear time-invariant (DPLTI) filter structures. DPLTI structures as defined herein are discrete linear time-invariant signal processing structures having two input signals and two output signals. Example embodiments are described which demonstrate some, but not all, of the possible design and implementation options for realizing DPLTI-based covering and uncovering modules.

Some of these embodiments use lattice-based implementations which may, in some cases, offer computational and/or design advantages relative to other, functionally equivalent, designs. Variants of these embodiments are shown which require fewer computations for implementation and therefore offer substantial hardware and/or complexity savings. In all cases the described embodiments may be implemented using a variety of alternative filtering structures which are well known to those of ordinary skill in the art of digital signal processing.

Figure 1A:
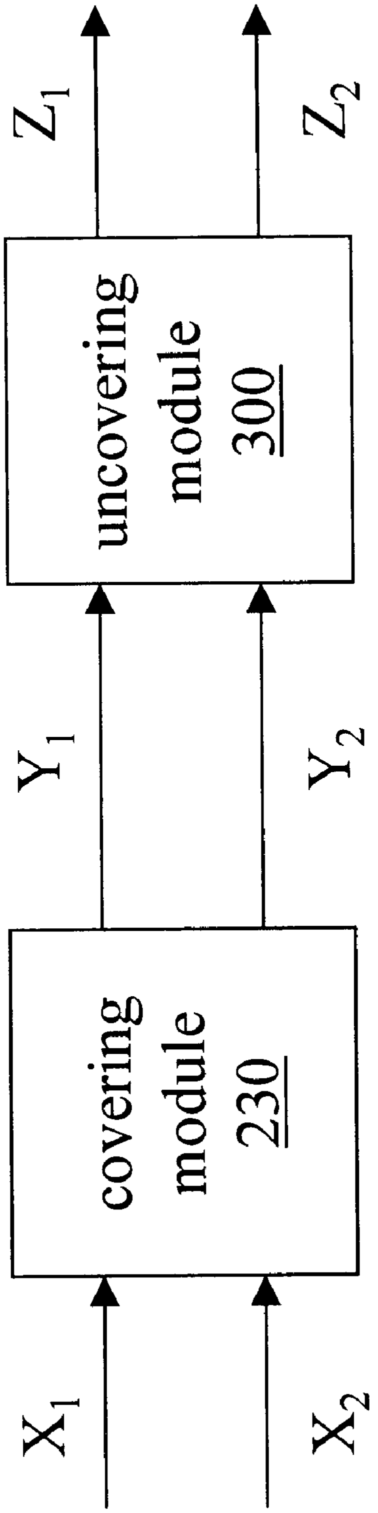
FIG. 1A is a block diagram of a system for data transfer according to an embodiment of the invention.

FIG. 1A shows a block diagram for a system for data transfer according to an embodiment of the invention. Covering module 230 is a DPLTI structure that receives two input signals $X_1$ and $X_2$ and produces a transmission signal having two components $Y_1$ and $Y_2$. Uncovering module 300 is a DPLTI structure corresponding to covering module 230 that receives the transmission signal and produces two output signals $Z_1$ and $Z_2$ that are estimates of the input signals $X_1$ and $X_2$.

Figure 2A:
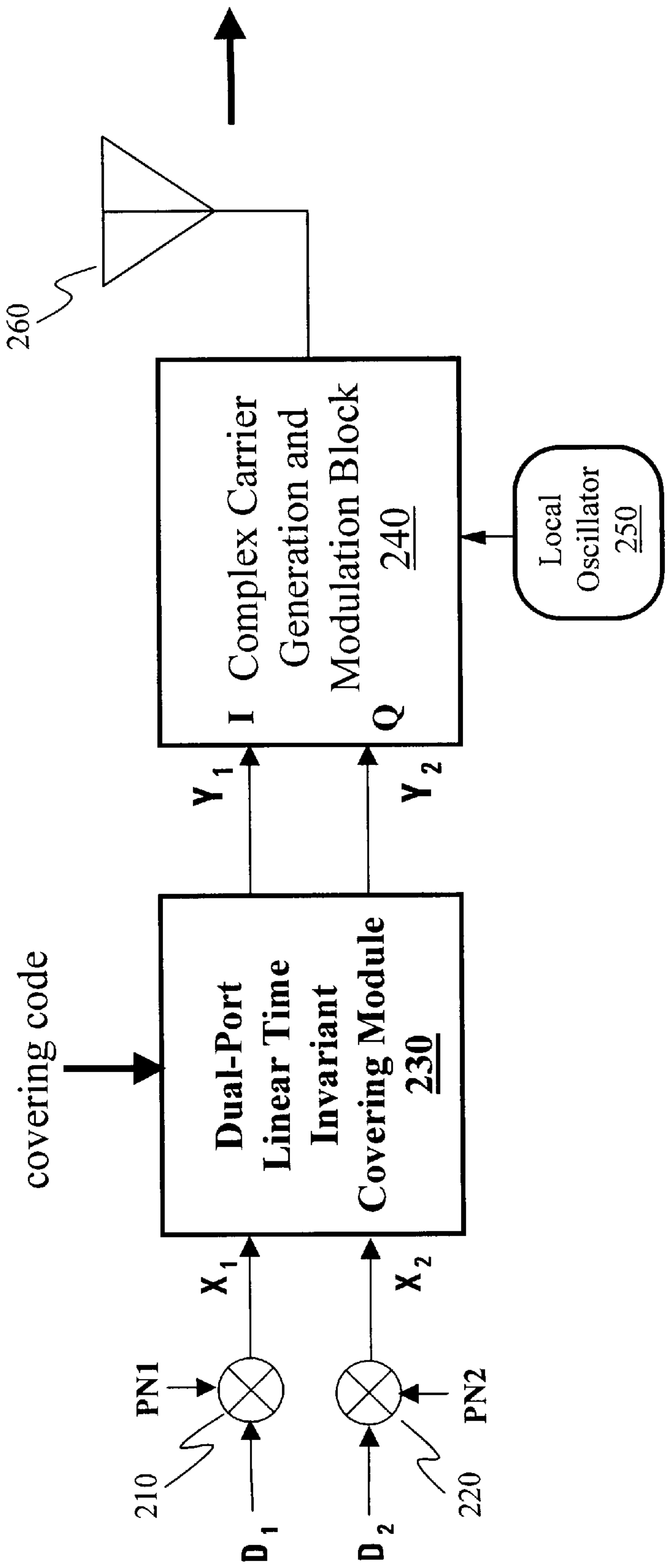
FIG. 2A is a block diagram of the transmitting portion of a communications system using a dual-port linear time-invariant covering module.
Figure 2B:
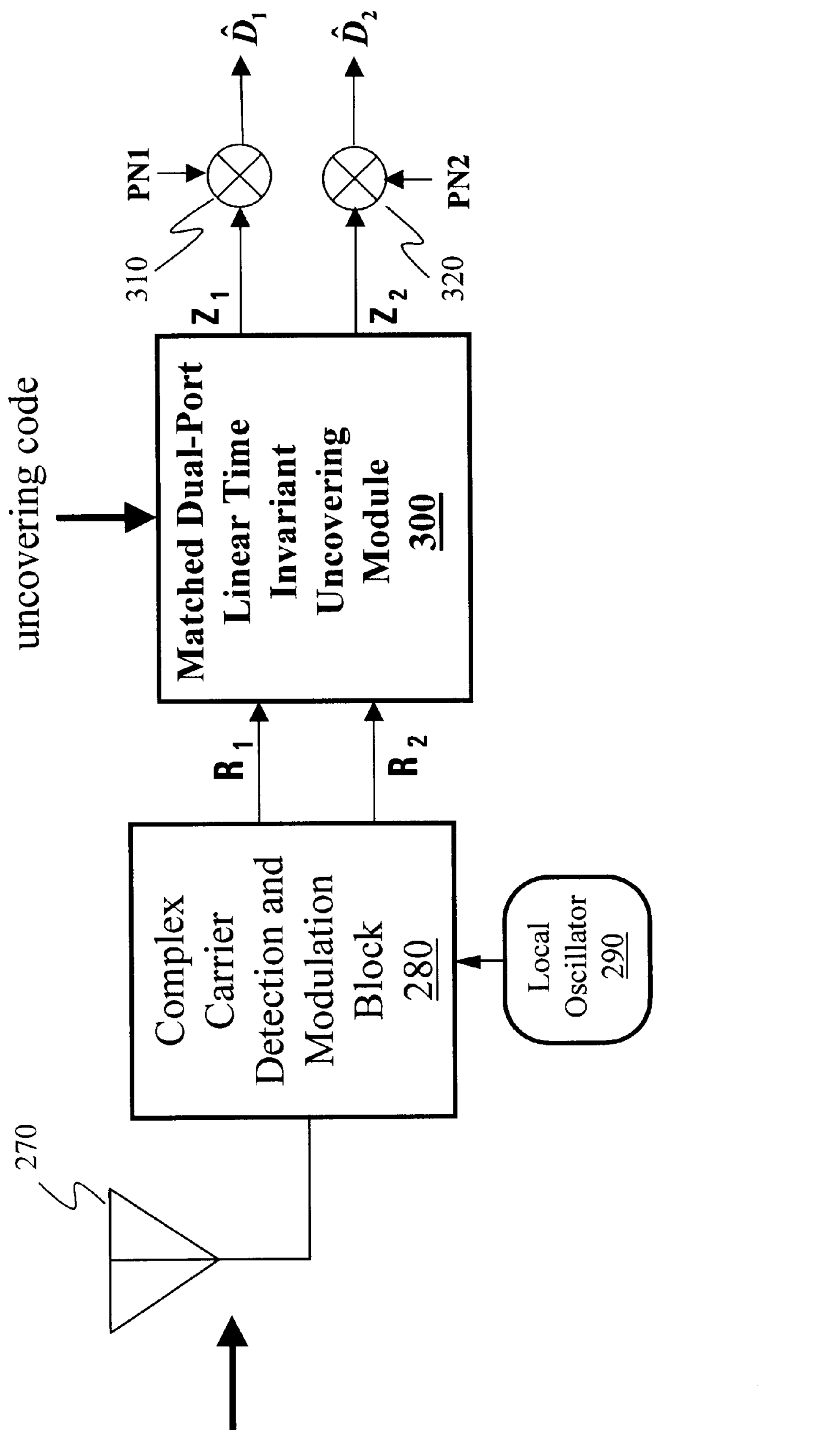
FIG. 2B is a block diagram of the receiving portion of a communications system using a dual-port linear time-invariant uncovering module.

FIGS. 2A and 2B illustrate a particular application of DPLTI covering/uncovering modules to a system for wireless communications, surveillance and/or navigation according to the described embodiments. In FIG. 2A, two input baseband data streams ($D_1$ and $D_2$) are PN spread and applied to the two input ports $X_1$ and $X_2$ of DPLTI covering module 230. The baseband data streams $D_1$ and $D_2$ may derive from separate sources or, as is the case in many CSN applications, they may be obtained by demultiplexing a single input sequence.

In order for the transmitted signal to appear as white Gaussian noise, each of the two data streams applied to ports $X_1$ and $X_2$ must be a white random sequence and the two streams must be uncorrelated. Decorrelation and whitening of the two streams applied to ports $X_1$ and $X_2$ may be accomplished by applying a different PN code to each stream $D_1$ and $D_2$; in the system of FIG. 2A, this function is performed by PN codes PN1 and PN2 and multipliers 210 and 220. In the case where streams $D_1$ and $D_2$ and PN codes PN1 and PN2 are all binary-valued, multipliers 210 and 220 may each be implemented with an XOR gate.

Outputs $Y_1$ and $Y_2$ of DPLTI covering module 230 are applied to the in-phase (I) and quadrature (Q) inputs, respectively, of complex carrier generation and modulation block 240, and the modulated carrier is transmitted through antenna 260. PN coders and carrier generation and quadrature modulation systems are well understood by CSN engineers and practitioners. Complex carrier generation and modulation block 240 is assumed to include lowpass and/or bandpass filters that act to limit the total bandwidth of the modulated signal to be no greater than (and preferably less than) the signaling rate (i.e., the chip rate in the case of DSSS systems) of the inputs $Y_1$ and $Y_2$ (such filters are also referred to as Nyquist filters).

At the receiver, as shown in FIG. 2B, the incident signal is received by antenna 270 and converted to complex baseband format via quadrature demodulation in complex carrier detection and modulation block 280. The in-phase and quadrature components of the baseband signal are applied, respectively, to the two input ports $R_1$ and $R_2$ of DPLTI uncovering module 300. Outputs $Z_1$ and $Z_2$ of uncovering module 300 are multiplied with PN codes PN1 and PN2, respectively, in multipliers 310 and 320 to generate estimates of the original input data streams $\hat{D}_1$ and $\hat{D}_2$, respectively. In the case where outputs $Z_1$ and $Z_2$ and PN codes PN1 and PN2 are all binary-valued, multipliers 310 and 320 may each be implemented with an XOR gate.

Recovery of the desired data streams from the received Gaussian noise-like signal is accomplished because uncovering module 300 is implemented to be a matched filter version of DPLTI covering module 230. It is a well-known principle in the art that matched filters are optimal in white Gaussian noise, in that they provide the maximum possible signal-to-noise ratio (as discussed in reference B.11, which document is hereby incorporated by reference). However, it is also possible for the original filter to have distorted the signal such that the signal outputted by the matched filter will not be exactly the same as the signal inputted to the original filter.

Matched filter receivers typically introduce distortion into the recovered signal in the form of intersymbol interference (ISI). Although ISI may be objectionable in some applications, it can be quite acceptable in covert wireless applications in which the received signal power spectral density is significantly smaller than that of the receiver noise power. Specifically, in certain envisioned covert applications, receiver sections downstream to uncovering module 300 use correlation techniques providing processing gain to greatly enhance the desired signal relative to the noise, effectively pulling the signal out of the noise. This same coherent processing also greatly enhances the desired signal relative to uncorrelated ISI, so that any residual ISI introduced by uncovering module 300 may be quite acceptable. (Indeed, it can be shown mathematically that the signal-to-interference ratio approaches infinity with probability one as the correlation time approaches infinity.)

An important attribute of a system according to the described embodiments of the invention is that the filter coefficients used in the covering/uncovering modules provide a set of code parameters which are unique to a particular matched pair. Therefore it is possible to cover a data sequence using a first code such that a receiver having an uncovering module that uses a second code cannot decode or even detect it.

FIG. 2B illustrates a system applicable to the case in which the phase angles of the transmit and receive local oscillators 250 and 290, respectively, are synchronized such that the signals $R_1$ and $R_2$ in FIG. 2B are the same as the signals $Y_1$ and $Y_2$ in FIG. 2A, respectively, to within a scale factor. If these phase angles are not properly aligned, however, then the signals $R_1$ and $R_2$ will each contain contributions from both $Y_1$ and $Y_2$ in proportions related to the phase angle error. In practical coherent systems, it is necessary to estimate the phase difference and to correct for it in order to achieve the desired output signal-to-noise ratio. Estimation of the phase error can be accomplished by employing two identical uncovering modules at the receiver, as described later in this document. The phase estimation technique may be applied with equal advantage to systems according to all of the described embodiments of the invention. For simplicity and clarity we first describe the various embodiments without consideration of the phase issue. We then describe how two uncovering modules of the invention may be used to estimate and correct for phase offset, with references to FIGS. 15 and 16.

Embodiments Using Finite-Impulse-Response (FIR) Filters

When one or more FIR filters are used as part of a covering module, as in the CSN system of FIGS. 2A and 2B, the complementary uncovering module contains filters matched to the covering FIR filters. The matched filter of a FIR filter is simply the same filter with the coefficients in reverse order and also conjugated (i.e. the imaginary components are replaced by their additive inverses). Clearly, the matched filter of a FIR filter is itself a FIR filter, and therefore it also possesses the properties of linearity and shift invariance.

First embodiment of the Invention: FIR Lattice Implementation

Figure 3:
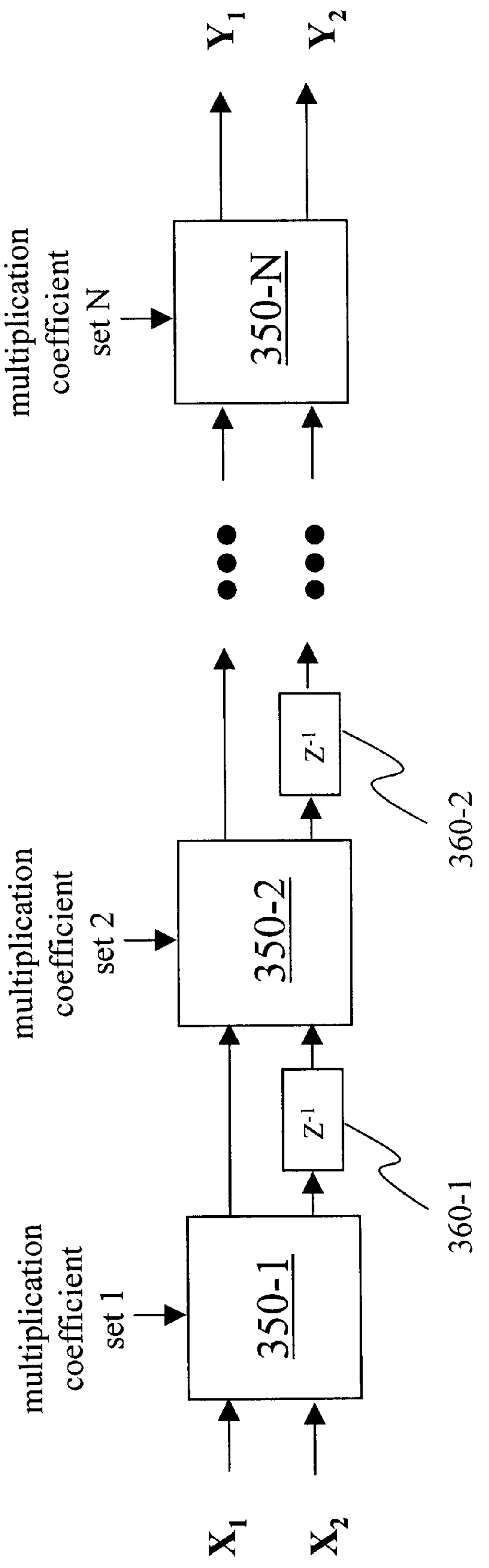
FIG. 3 is a block diagram of a lattice FIR structure.

A system according to the first embodiment of the invention employs, as the covering module, an FIR lattice filtering structure that comprises a cascade of N lattice sections 350-i (where i is an integer from 1 to N) as shown in FIG. 3, where each section comprises a two-input, two-output operator. A unit sample delay ($z^{-1}$) 360-j (where j is an integer from 1 to N−1) is inserted into one of the two output paths of every lattice section 350-i except the last one 350-N. Such filtering structures are discussed in Section 3.3 of reference B.6 and Section 14.3.1 of reference B.7.

Figure 4:
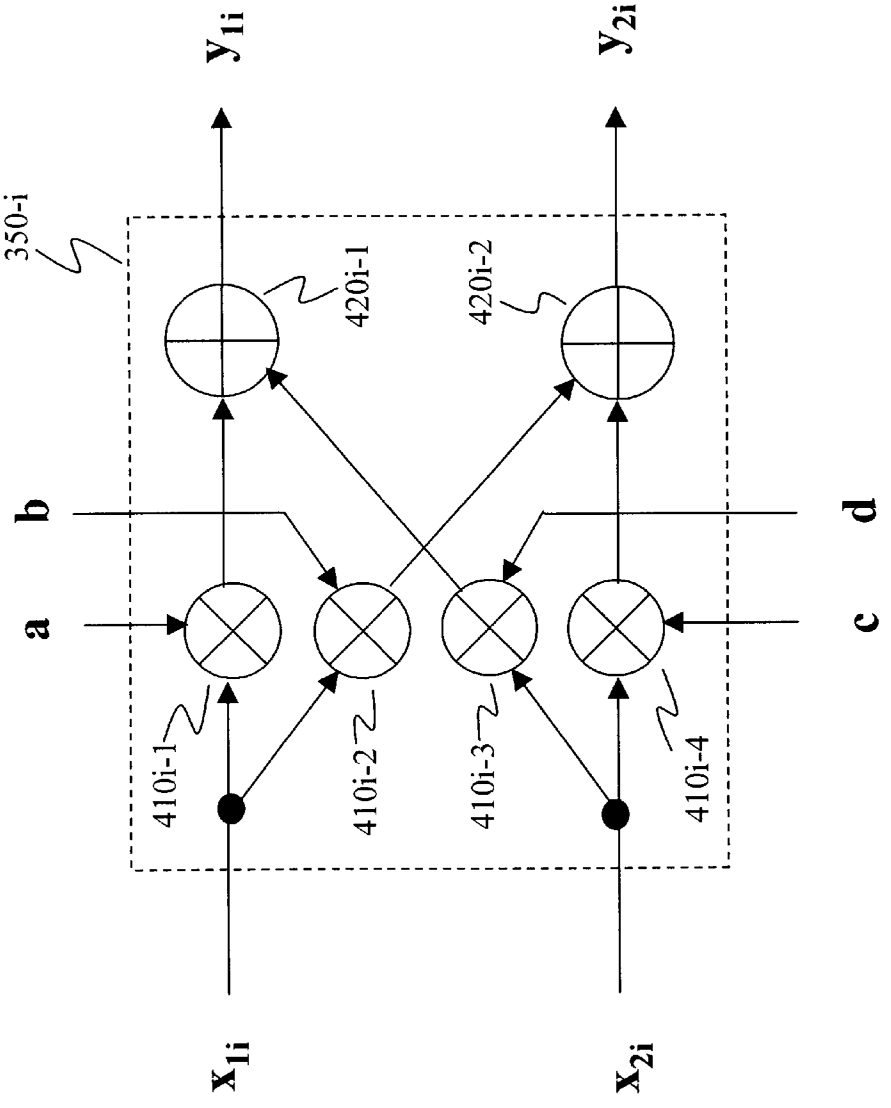
FIG. 4 is a block diagram of a generalized FIR lattice section.
Figure 5:
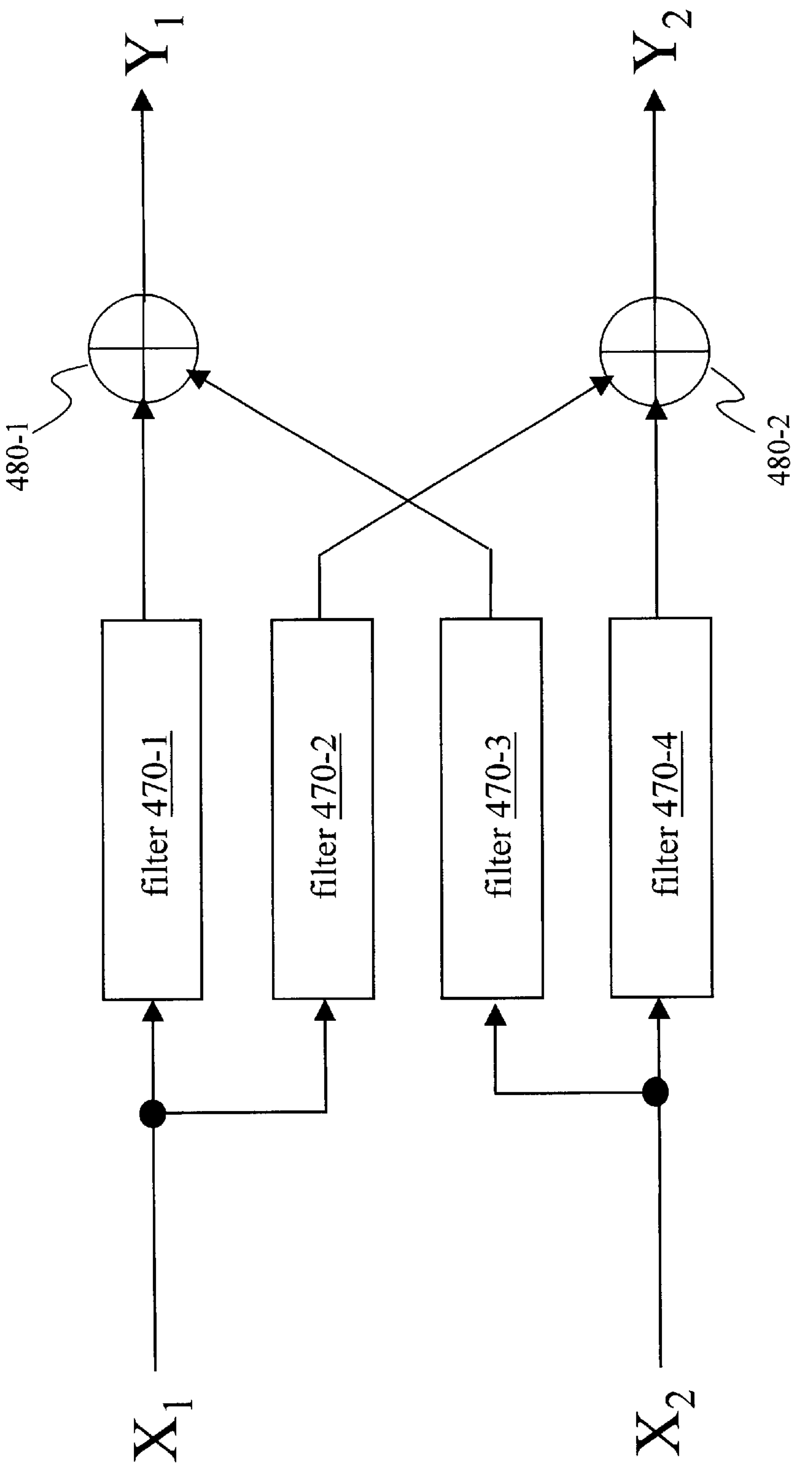
FIG. 5 is a block diagram of a structure comprising a direct-form FIR filter architecture which is functionally equivalent to the lattice structure of FIG. 3.

As indicated in FIG. 4, each lattice section 350-i contains four multiplication operations (as performed by multipliers 410i-1 through 410i-4) and two additions (as performed by adders 420i-1 and 420i-2), wherein the individual coefficients a, b, c, and d shown in FIG. 4 constitute the multiplication coefficient set i indicated in FIG. 3. Note that the lattice filtering structure depicted in FIG. 3 can be constructed to be functionally equivalent to a structure comprising four direct-form FIR filters 470-1 through 470-4 interconnected via adders 480-1 and 480-2 as shown in FIG. 5, provided that the various multiplication coefficients of the two structures are selected appropriately. In other words, for each possible collection of N sets of coefficients in the lattice structure of FIG. 3 there exists a corresponding collection of 4 sets of coefficients in the direct-form structure of FIG. 5. We describe covering and uncovering modules for a system according to the first embodiment of the invention in terms of the lattice implementation. Later, we describe how to compute the direct-form tap weights from the lattice design, thereby demonstrating another embodiment of the invention which is functionally equivalent but architecturally different.

For application as a covering or uncovering module, it is useful to restrict the individual lattice sections in the structure of FIG. 3 to be orthogonal rotation operators. In such a design, the four multiplications in each lattice section 350-i as shown in FIG. 4 derive from a single parameter—a rotation angle—and the multiplication coefficients for the $i^{th}$ lattice section are $$a=\cos(\theta_i),\ b=\sin(\theta_i),\ c=\cos(\theta_i),\ d=-\sin(\theta_i) \tag{1}$$

where $\theta_i$ is the parameter, or rotation angle, defining the action of the lattice section 350-i. In general, $\theta_i$ may assume any real value.

The distinguishing characteristic of a pure rotation is that in a lattice section as shown in FIG. 4 wherein the coefficients are defined as in Expression (1) above, the total power measured at the two output ports $y_{1i}$ and $y_{2i}$ at any frequency is equal to the total power applied to the two input ports $x_{1i}$ and $x_{2i}$ at that frequency. As the delay operators 360-i inserted between the lattice sections of FIG. 3 possess the same property, it therefore follows that when the rotation restriction is observed, the entire N-stage lattice filtering structure of FIG. 3 becomes power-conserving at every frequency, regardless of the values of the various rotation angles. This so-called ‘power-complementary’ property is characteristic of a broad class of LTI systems in which the total power output from two or more filters equals that of their (common) input.

Figure 6A:
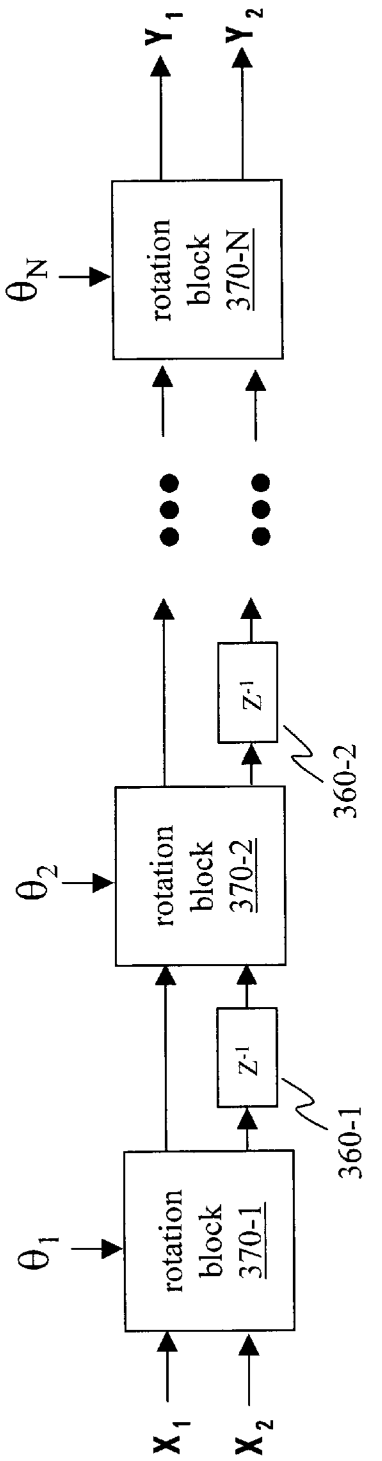
FIG. 6A is a block diagram of a covering module for a system according to a first embodiment of the invention.

By constructing the lattice cascade of FIG. 3 as a series of orthogonal rotation operators (i.e. by redesignating each lattice section 350-i as a rotation block 370-i and defining each multiplication coefficient set i as in Expression (1) above), the structure of FIG. 6A may be obtained. All power-complementary pairs of FIR transfer functions can be synthesized using the lattice filtering structure of FIG. 6A. When this rotation structure is used to implement the covering module of FIG. 2A, the covering module has the remarkable property that for any parameter vector of angles $\{\theta\}=[\theta_1, \theta_2, \ldots, \theta_N]$, the output waveform has the highly desirable LPD properties P1–P4 previously enumerated, assuming that the input sequences are white and uncorrelated.

FIG. 6A is a functional block diagram of a covering module according to the first embodiment of the invention. Vector $\{\theta\}$, which has as its elements the rotation angles of the individual rotation blocks 370-i in FIG. 6A, may be quite long (for example, N may be on the order of 50–100 or more). This vector provides a code for the structure of FIG. 6A, in that different selections for $\{\theta\}$ provide coding and selective addressing functions. Note especially that for a covert CSN application, the vector $\{\theta\}$ may be selected at random in order to thwart an interloper with a copycat receiver, and the overall cascade will still provide a transfer function having the desirable properties P1–P4.

Figure 6B:
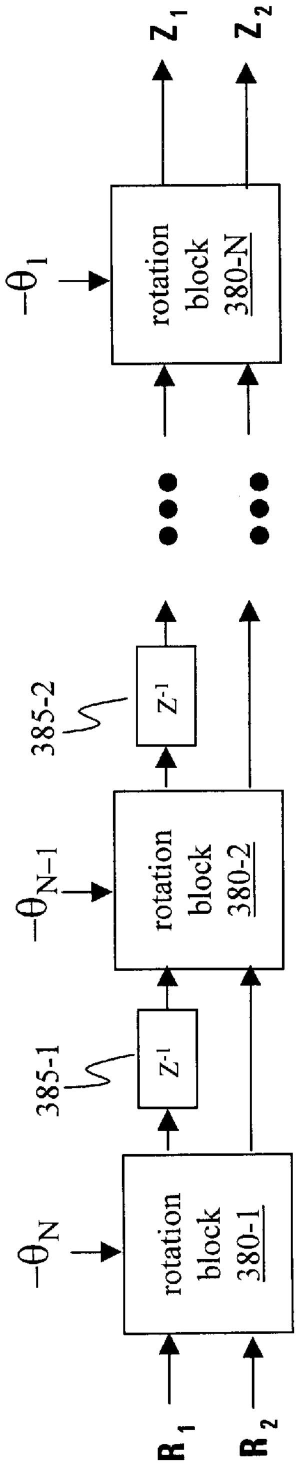
FIG. 6B is a block diagram of an uncovering module for a system according to the first embodiment of the invention.

A filtering structure matched to that of FIG. 6A is shown in FIG. 6B, representing a block diagram of an uncovering module according to the first embodiment of the invention (wherein rotation blocks 380-i and delay blocks 385-j are structurally identical to rotation blocks 370-i and delay blocks 360-j, respectively, of FIG. 6A). As a comparison of FIGS. 6A and 6B will demonstrate, the relationship between the two modules is such that for the uncovering module the order of appearance of the rotation angles is reversed, the signs of the rotation angles are inverted, and the inter-stage delay operators 385-j appear in the upper rail of the structure instead of the lower rail. This implementation follows directly from the well-known relationship which requires that the coefficients of the matched filter be the complex conjugates of the original values and, additionally, that they appear in time-reversed order.

Note that if an angle of zero specifies the behavior of a lattice section 350-i as shown in FIG. 4 and according to Expression (1), the multiplication coefficient set reduces to the values a=c=1, b=d=0. Thus the lattice section effectively becomes a pair of wires that pass the input signals directly through to the output with no change. The effect of such a reduction is to cause the two delay sections 360-(i-1) and 360-i adjacent to the lattice section 350-i (each having a unit delay) to aggregate together into a single delay section with delay of two units. Therefore, one may see that if, for example, the defining angle for each even-numbered rotation block in the structure of FIG. 6A is set equal to zero, then the resulting structure can be drawn with inter-stage delays of two samples ($z^{-2}$) instead of one ($z^{-1}$).

Figure 7:
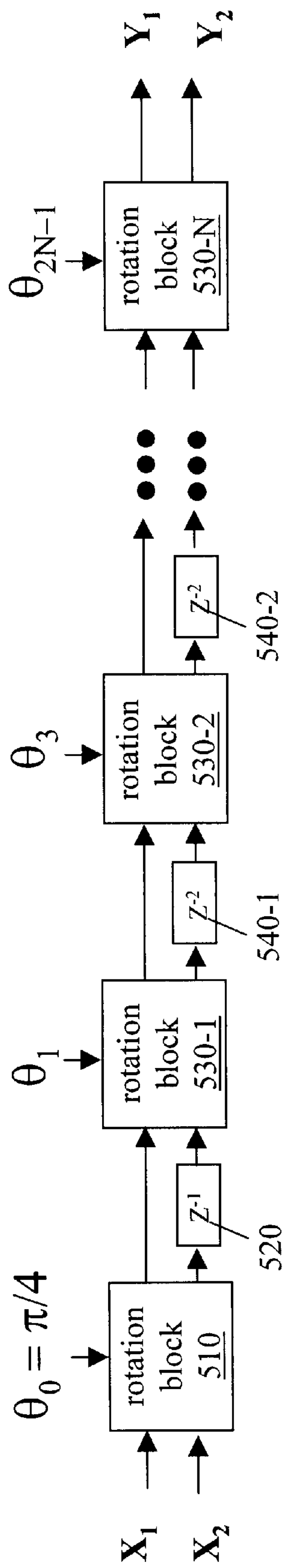
FIG. 7 is a block diagram of an alternative lattice FIR structure which generates filter responses having even-shift orthogonality.

A lattice structure comprising rotation blocks 530-i and two-sample delay elements 540-j is shown in FIG. 7 (rotation blocks 530-i being structurally identical to rotation blocks 370-i of FIG. 6A). A lattice cascade structure of this form is closely related to wavelet functions, and when such a structure is preceded by an initial rotation block of 45 degrees (i.e. $\pi/4$ radians) followed by a single sample delay as indicated by blocks 510 and 520, respectively, it exhibits wavelet-related filtering properties. Specifically, it can be shown that for the structure of FIG. 7, the response at points $Y_1$ and $Y_2$ for unit impulses applied at points $X_1$ and $X_2$ possesses even-shift orthogonality, an important property in wavelet theory. Indeed, it is possible to use the structure of FIG. 7 as an engine for generating all sequences of length 2N that possess even-shift orthogonality, including all discrete-time dyadic wavelets and all wavelet packets of length 2N (as discussed in Section 11.4.3 of reference B.7).

Mathematical Basis

To clarify the mathematical foundation for the broad class of FIR-based structures used in systems according to the first and second embodiments of the invention, it is useful to express the relationship between the z-transform inputs ($X_1$, $X_2$) and outputs ($Y_1$, $Y_2$) of a two-input, two-output LTI system (e.g., as shown in FIG. 3) in matrix notation. Accordingly, we define the transfer function matrix H(z) such that Y=H(z)X, where X and Y denote the column vectors $[X_1\ X_2]^T$ and $[Y_1\ Y_2]^T$, respectively. Thus, H(z) is a 2×2 matrix of transfer functions.

A 2×2 matrix H(z) of transfer functions is said to be paraunitary if the following relationship holds for all z upon which H(z) and $\tilde{H}(z)$ are defined:

$$H(z)\tilde{H}(z)=cI, \tag{2}$$

where c>0, I is the 2×2 identity matrix, and the tilde denotes the operation of paraconjugation. The paraconjugate $\tilde{H}(z)$ of a matrix H(z) is obtained by first conjugating the coefficients of H(z), then replacing z with $z^{-1}$, and then transposing the result (as discussed in Section 3.2 of reference B.6 and Chapters 6 and 14 of reference B.7). A two-input, two-output signal processing structure parameterized by a vector $\{\theta\}$ is said to be structurally lossless (SL) provided that its 2×2 matrix H(z) of transfer functions is paraunitary [i.e. satisfies Condition (2)] for all $\{\theta\}$. The broad class of FIR-based DPLTI structures used as covering and uncovering modules in systems according to the first and second embodiments of the invention are known as 2×2 structurally lossless (SL) implementations.

Computational Considerations

In order to maximize the Gaussian covering effect, it is preferable to use as long a coefficient set as possible, depending upon application-specific constraints such as acceptable time delay and available processing and storage capacity. By contrast, computational considerations indicate using shorter filters, and the designer must therefore balance these competing objectives against one another in each application. Computational complexity and hardware requirements may also be eased by a judicious choice of filter coefficients. For example, coefficient values of 0, +1, and −1 will eliminate all multiplications from the implementation, leading to a structure containing additions only. Restriction of the coefficient values may impose limitations, however, such as fewer available coefficient sets to choose from, which will need to be considered in the design tradeoff.

Figure 8A:
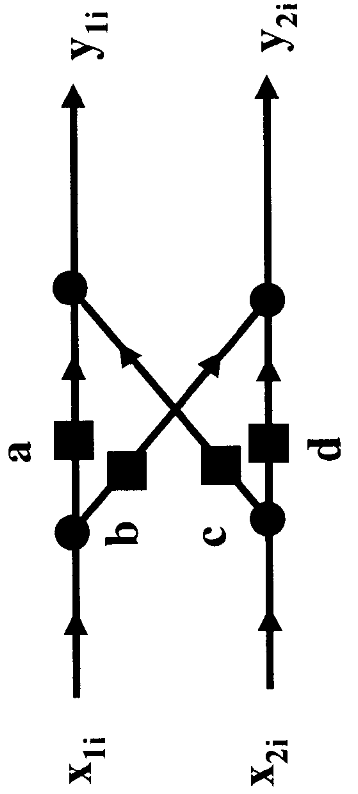
FIG. 8A shows a block diagram of a normalized rotation block.
Figure 8B:
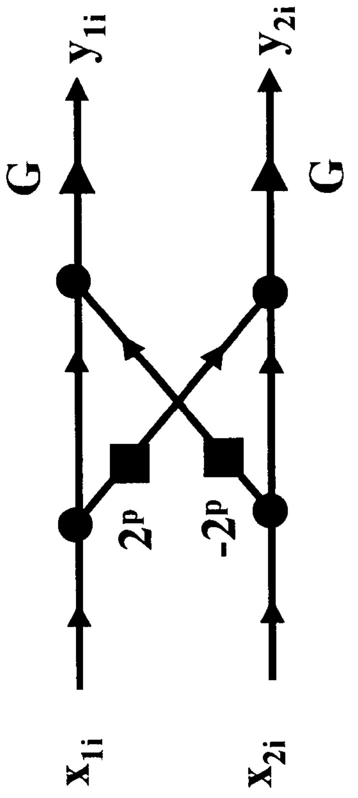
FIG. 8B shows a block diagram of an unnormalized rotation block.

Note that properties P1–P4 will be preserved for all sets of rotation angles. This feature allows for a certain hardware savings by, for example, selecting the rotation angles from among those angles whose tangents are factors by which other values are easily multiplied. Consider the signal-flow diagram of a rotation block in FIG. 8A, where a, b, c, and d are defined in Expression (1) above. If $\theta_i$ is chosen such that tan $\theta_i$ is an integer power of 2, for example (e.g. $2^P$, where p is an integer), then we have that sin $\theta_i=2^P G$ and cos $\theta_i$=G, where G is some real-valued common factor. By moving the common factors G outside the lattice proper, we may perform the rotation by $\theta_i$ with the simplified 'unnormalized' structure of FIG. 8B. Moreover, as multiplication of a digital value by a power of 2 is equivalent to shifting the value in the appropriate direction (i.e. left for positive p, and right for negative p), the lattice no longer requires any multiplication hardware. As for the common factors ('normalizing gain') G, each section of the cascade has a linear response, so these factors can be moved to the output end of the lattice cascade (or to a small number of intermediate points) to be aggregated with the normalization factors for other sections into a single pair (or small number) of multiplications.

Figures 9A, 9B:
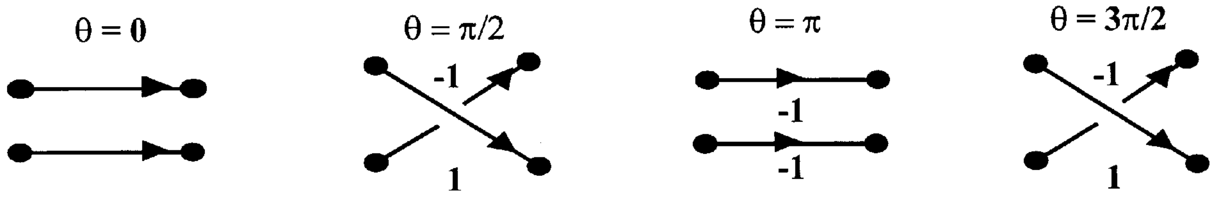
FIG. 9A illustrates four rotation blocks that require no numerical computation.
FIG. 9B shows five example impulse responses produced by a sparse lattice implementation.

Computation can be even further reduced in the lattice structures of FIGS. 6A, 6B, and 7 by using for $\theta_i$, at selected points in the cascade, one of the four "friendly" angles which require no computation (i.e. 0, $\pi/2$, $\pi$, and $3\pi/2$ radians). FIG. 9A depicts the rotation blocks associated with these angles and how each of them reduces to little more than an appropriate pair of wires. Clearly, lattice sections defined by these angles require no calculation.

As an example of how the "friendly" angles may be used, consider FIG. 9B. Each row in this figure is an example impulse response $Y_1$ of the even-shift orthogonal lattice structure depicted in FIG. 7 with N=16, most of the lattice sections being parameterized by "friendly" angles (in this case, the impulse is inputted as signal $X_1$, while signal $X_2$ is held at zero value). FIG. 9C shows the five rows of rotation angles $\theta_1, \theta_3, \theta_5, \ldots, \theta_{31}$ that were used to generate the five rows of FIG. 9B, respectively (note that $\theta_0=\pi/4$ radians, as shown in FIG. 7). Only five of the angles in each set are not "friendly" ones. This means that only six sections of each of the corresponding lattice cascades require additions, namely sections 0, 1, 3 ,7, 15 and 31! Therefore, by using unnormalized rotations for these six sections, the lattice cascade of Figure (7) can calculate each output sample with only 12 additions (two each for the six sections).

In general, substantial computational savings can be gained by using the "friendly" angles as shown in FIG. 9A to introduce some sparseness into the lattice cascade. Provided this is done judiciously, the associated FIR filter will remain fully populated with non-zero tap weights, as shown in the example of FIG. 9B. If $S_K$ and $S_L$ denote successive rotation blocks having angles that are not "friendly," and the delay inserted between these blocks totals D samples, then the impulse responses at the outputs of $S_L$ are linear combinations of (1) the impulse response observed at the upper output of section $S_K$ and (2) the impulse response observed at the lower output of section $S_K$, delayed by D samples. Thus, if D exceeds the lengths of the impulse responses observed at the outputs of section $S_K$, then the impulse responses observed at the outputs of section $S_L$ will have intermediate zero-value samples. This circumstance sets a limit on how sparse one can make a lattice cascade and still achieve a fully populated impulse response (i.e. one having no internal zero-value samples). Specifically, recursive application of this property to the lattice cascade of FIG. 6A shows that the length of the longest fully populated impulse response that may be obtained with a structure wherein only Q lattice sections are parameterized by angles that are not "friendly" is $2^{Q-1}$, and that this length may be achieved by using angles that are not "friendly" only for $\theta_u$, where $u=2^v$ and v is an integer from 0 to Q−1.

For example, if in the structure of FIG. 6A one selects N to be a positive power of two (i.e. $N=2^C$, where C is a positive integer), and one uses angles which are not "friendly" only for the (C+1) rotation blocks 370-m (where $m=2^k$ and k is an integer from 0 to C), then only (C+1) lattice sections will require computation. In general, each such computation will be equivalent to a complex multiplication, consisting of four real multiplications and two real additions. Thus, by using sparse lattice methods each output sample can be calculated with only (C+1) complex multiplications. However, if unnormalized rotations are used for the lattice angles which are not "friendly," then the multiplications may be eliminated entirely (except for the gain factors, which may be accumulated into one pair of real multiplications), resulting in a net computational requirement of only 2×(C+1) additions per output point. The sparse lattice implementation may therefore be regarded as a fast implementation of the example FIR filters.

Perfect Reconstruction

As indicated earlier, matched-filter architectures can introduce distortion into the reconstructed signal in the form of ISI, but this distortion is generally acceptable in covert CSN applications. However, a special circumstance exists with regard to processing structures derived from structurally lossless (SL) designs.

With reference to FIG. 2A and 2B, the receiver demodulator output sequences $R_1$ and $R_2$ will generally be phase-rotated relative to the transmitter modulator input sequences $Y_1$ and $Y_2$, with the phase rotation factor $e^{j\Phi}$ reflecting the phase difference between the transmit and receive local oscillators 250 and 290, respectively, as well as propagation and sampling delay. In addition to this phase rotation, the uncovering operation introduces limited amounts of ISI into the outputs of the uncovering filters. However, it can be shown that the ISI is phase-orthogonal to and uncorrelated with the desired signal components. Thus it is possible to extract the desired component with no accompanying ISI if one has knowledge of the phase rotation angle $\phi$. Under ideal conditions (i.e., in the absence of noise and with accurate estimation and correction of the phase bias), the sequences outputted by the uncovering module will simply be delayed and amplitude-scaled versions of the sequences inputted to the covering module, and perfect reconstruction (PR) of the input sequences will be achieved. Methods for determining and compensating for the phase angle offset may be applied in conjunction with all of the described embodiments of the invention and are discussed later in this document.

Second Embodiment of the Invention (Direct-form FIR Filters)

We now describe how to compute tap weights (i.e. filter coefficients) for a structure that is functionally equivalent to a lattice structure according to the first embodiment of the invention, using direct-form FIR filters instead of the lattice architecture. As shown in FIG. 5, a structure suitable for use as a covering module according to the second embodiment of the invention is a version of the DPLTI architecture which comprises four direct-form FIR filters. The functionality of the implementation depends on the number of taps in the individual filters and on the specific values of the multiplication weights applied at each tap. To achieve equivalence with an N-stage lattice structure, for example, each of the direct-form FIR filters must contain N taps.

It is well known in signal processing that the impulse response of a linear time invariant system characterizes the system and completely defines its performance. In other words, totally different implementations that exhibit the same impulse response characteristics are functionally exactly equivalent. With reference to the lattice structure depicted in FIG. 3, we note that there are two inputs and two outputs. The same is true for the direct-form structure of FIG. 5. Therefore, one design procedure for the second embodiment of the invention comprises (a) selecting an appropriate set of rotation angles for a reference lattice implementation as in FIG. 6A and (b) calculating the impulse responses of the resultant lattice structure. The impulse response time sequences are then used as tap weight sets for the direct-form filters, as described in the following procedure:

Step 1: Apply a unit impulse input to the $X_1$ port and a zero input to the $X_2$ port of the reference lattice implementation.

A) Record the response of the lattice structure at output $Y_1$. This sequence is the impulse response $f_1(n)$ of filter 430-1 [having transfer function $F_1(z)$].

B) Record the response of the lattice structure at output $Y_2$. This sequence is the impulse response $f_2(n)$ of filter 430-2 [having transfer function $F_2(z)$].

Step 2: Apply a unit impulse input to the $X_2$ port and a zero input to the $X_1$ port of the reference lattice implementation.

A) Record the response of the lattice structure at output $Y_1$. This sequence is the impulse response $f_3(n)$ of filter 430-3 [having transfer function $F_3(z)$].

B) Record the response of the lattice structure at output $Y_2$. This sequence is the impulse response $f_4(n)$ of filter 430-4 [having transfer function $F_4(z)$].

The computed time sequences $f_1(n)$, $f_2(n)$, $f_3(n)$, and $f_4(n)$ are then used as the direct-form tap weights of the four corresponding component FIR filters of FIG. 5 (i.e. $f_k(i)=w_{ki}$, where k is an integer from 1 to 4 and the $w_{ki}$ comprise the array of tap weights for the k-th component filter as shown in FIG. 1). The resulting structure exhibits exactly the same input/output behavior as the reference lattice implementation used to derive the tap weights.

When the lattice coefficients are selected in accordance with SL design principles (i.e. as rotations and scale factors only), the procedure outlined above will establish the following relationships between the transfer functions of the four basic FIR filters: $F_1(z)$ and $F_2(z)$ will be a power-complementary pair, as will $F_3(z)$ and $F_4(z)$ (where Fk(z) identifies the filter whose coefficients are the series $f_k(n)$). Power-complementary filters are well known in signal processing (as discussed in Section 3.2 of reference B.6 and Section 3.5 of reference B.7). These filters have the property that if arbitrary sinusoids having the same frequency are applied simultaneously to both filter inputs, the sum of the output powers of the two filters will equal that of the input sinusoids, independent of frequency. As a consequence, the sum of the power spectra of the filter transfer functions equals a constant. In addition, $F_1(z)$ and $F_4(z)$ will be a matched filter pair, as will $F_2(z)$ and $F_3(z)$. These relationships may also be used to design the direct-form tap weights directly, e.g., by employing well-known design principles for power-complementary FIR filters and matched filters (as discussed in Section 3.2 of reference B.6 and Section 14.3.2 of reference B.7).

Figure 10A:
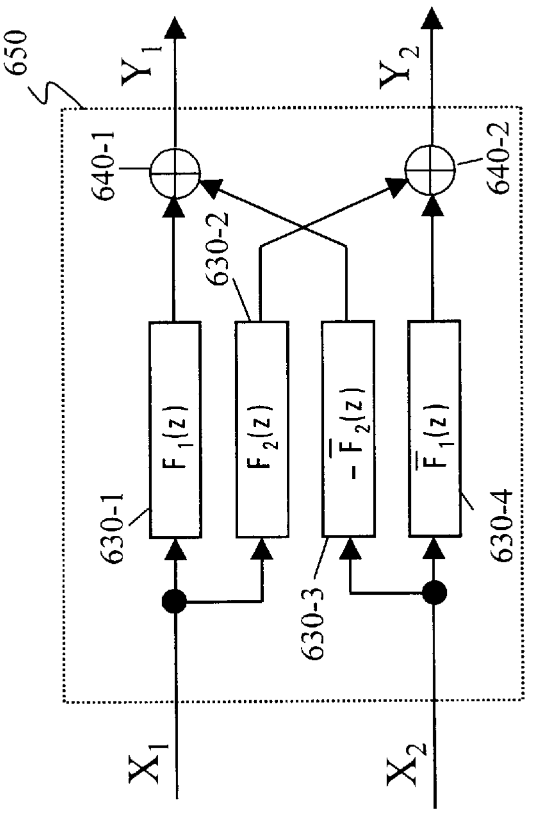
FIG. 10A is a block diagram of a covering module for a system according to a second embodiment of the invention.
Figure 10B:
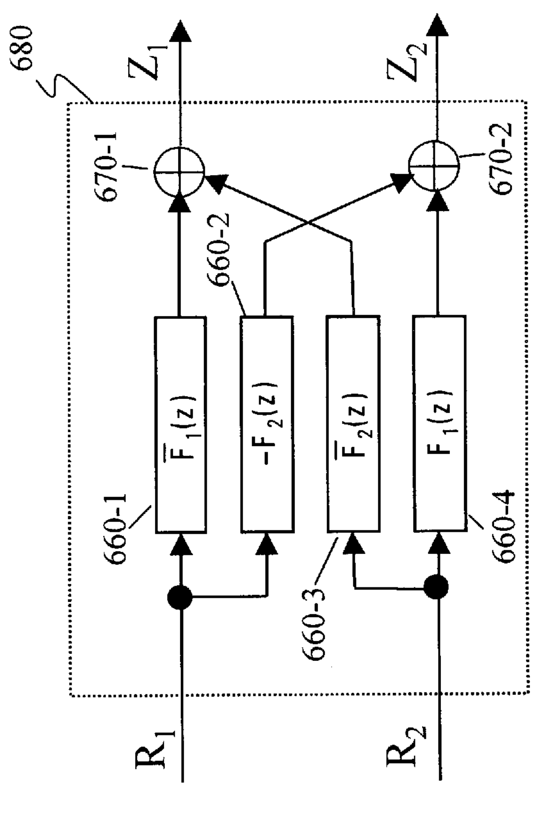
FIG. 10B is a block diagram of an uncovering module for a system according to the second embodiment of the invention.

FIGS. 10A and 10B are block diagrams of covering and uncovering modules, respectively, according to the second embodiment of the invention which indicate the relationships between the constituent FIR filters. In this figure, $F_1(z)$ and $F_2(z)$ (i.e. the transfer functions of filters 630-1 and 630-2, respectively) are a power-complementary pair of FIR filters, and the transfer functions of their respective matched filters are indicated by an overbar. (Note that the transfer function of a matched filter and the paraconjugate of the transfer function of the original filter are related, in that the former may be obtained by time-shifting the latter to obtain a causal and therefore realizable function.)

Opportunities for computational savings also exist in a system according to this embodiment of the invention. For example, if the tap weights are all either +1or −1, the need for explicit multiplications disappears and the filter implementations will require only additions. Note that the rotation angles listed in FIG. 9C for five example sparse lattice structures do result in impulse response functions that contain only the values ±1, as shown in FIG. 9B. Thus, for each of the five example cases shown in FIGS. 9B and 9C, a lattice structure as in FIG. 6A and a direct-form FIR structure as in FIG. 10A would both achieve good computational efficiency under identical functional designs. Choice of one implementation or the other will depend on application-specific and implementation technology-specific design considerations.

Non-SL Designs

Given a sufficient number of filter taps, non-SL-derived tap weight schema used in DPLTI structures may also provide good Gaussian covering performance in a system according to a further embodiment of the invention. For example, a covering module in such a system may be constructed according to the structure of FIG. 11A, where the tap weights for the filters 430-1 through 430-4 may be chosen independently and at random. The corresponding uncovering module has a structure as shown in FIG. 11B, where the filters are matched to those of FIG. 11A as indicated. In the case where the tap weights for filters 430-1 through 430-4 are all real-valued, for example, the tap weight sets for the filters 450-1 through 450-4 may be obtained by time-reversing the tap weight sets of the filters 430-1, 430-3, 430-2, and 430-4, respectively.

Figure 11A:
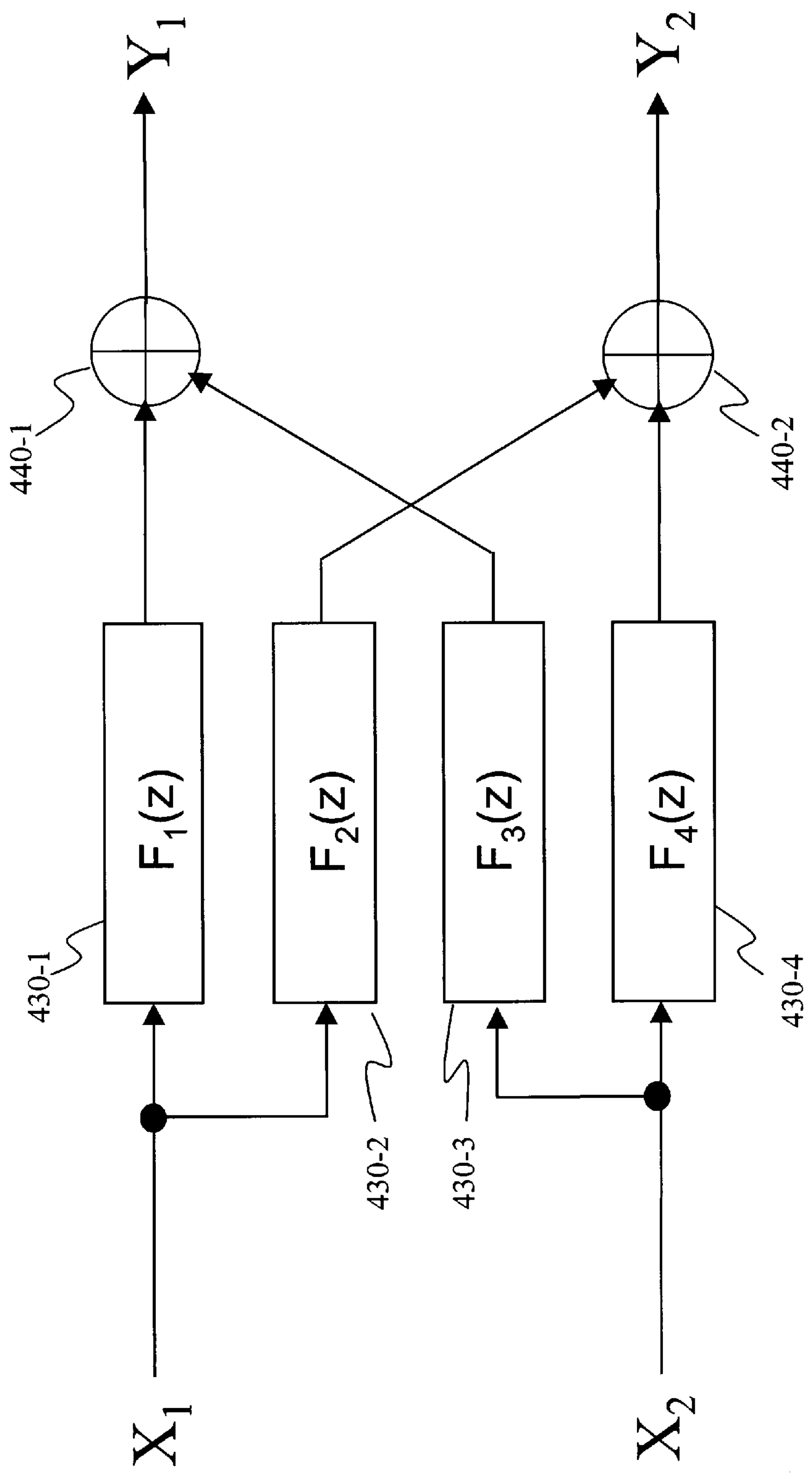
FIG. 11A is a block diagram of a covering module comprising a direct-form FIR filter architecture.
Figure 11B:
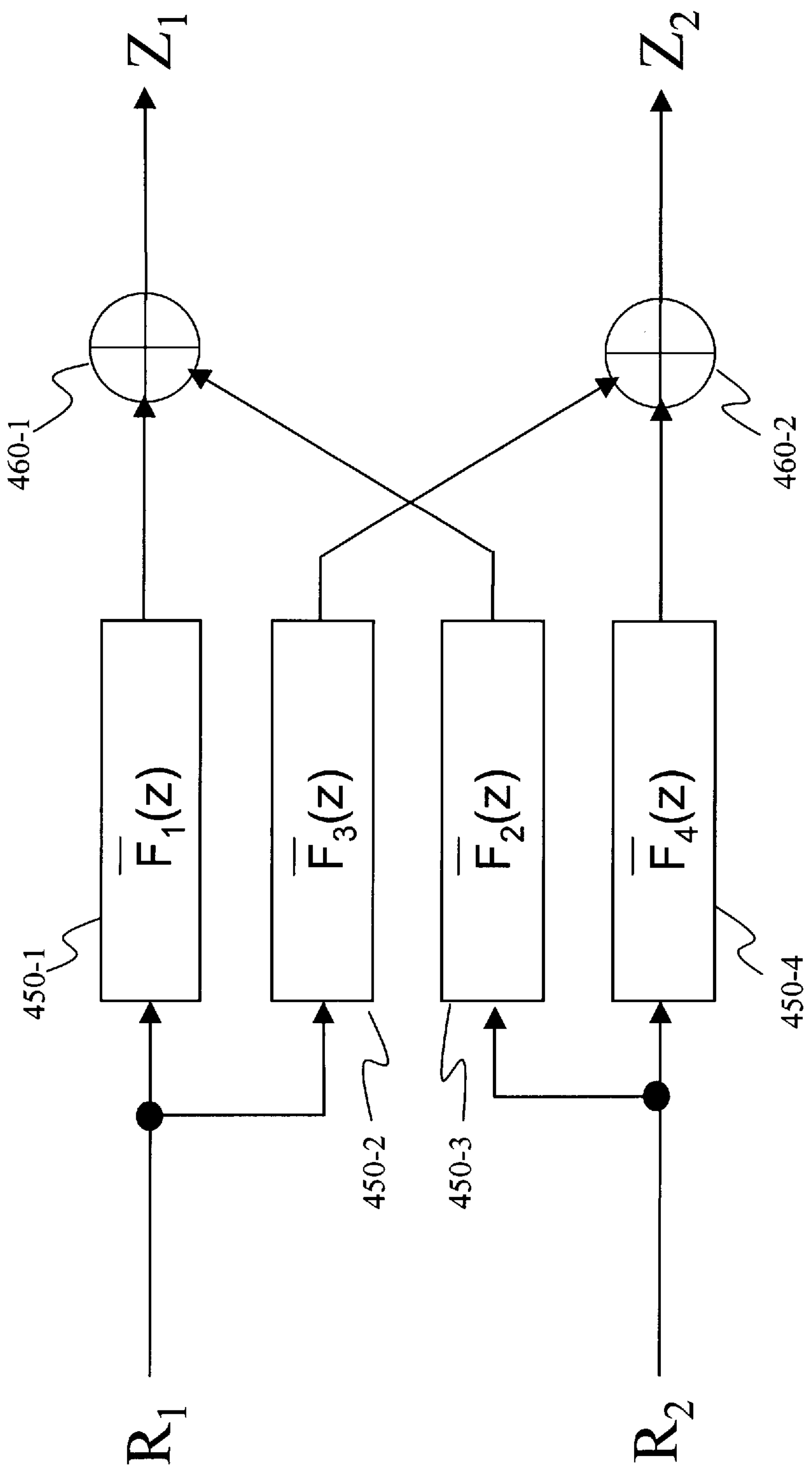
FIG. 11B is a block diagram of an uncovering module comprising a direct-form FIR filter architecture.

Alternatively, two random sets of weights may be selected, with the first set being used in the pair of filters 430-1 and 430-4 of FIG. 11A and the second set being used in the pair of filters 430-2 and 430-3. The uncovering module corresponding to this assignment has the structure shown in FIG. 11B, where the filters are matched to those of FIG. 11A as indicated. In a variation of this implementation, the set of weights used in one of these four filters is replaced by its additive inverse (the same inversion being performed on the corresponding filter in FIG. 11B); this particular assignment creates a classical complex FIR structure with independent random weights on the real and imaginary components (i.e. with independent random complex weights). Note that non-SL designs may also be implemented in the lattice structure by removing the rotational constraints from the four multiplications in each section.

The use of random tap weights or other weight sets not equivalent to 2×2 structurally lossless designs can introduce possibly undesirable, non-constant spectral properties. In addition, it may not be possible to achieve the perfect reconstruction property in such cases. However, non-constant spectral shapes and nominal levels of ISI may not pose problems in some applications, and the broader range of possible tap weights afforded by departure from the structurally lossless constraint may be useful in such cases. One such example applicable to the direct-form covering and uncovering modules shown in FIGS. 11A and 11B is to randomly select the tap weights of the four component filters in FIG. 11A such that each tap weight is either +1or −1, thus eliminating all multiplication operations from the implementation. The total number of possible assignments of this type ($2^{4N}$ for the aggregate of the four N-stage filters) is much larger than the total number of possible SL-derived assignments using either +1or −1.

Embodiments Using Infinite-Impulse-Response (IIR) Filters

Third Embodiment of the Invention: IIR All-pass Filter Implementation

Figure 12B:
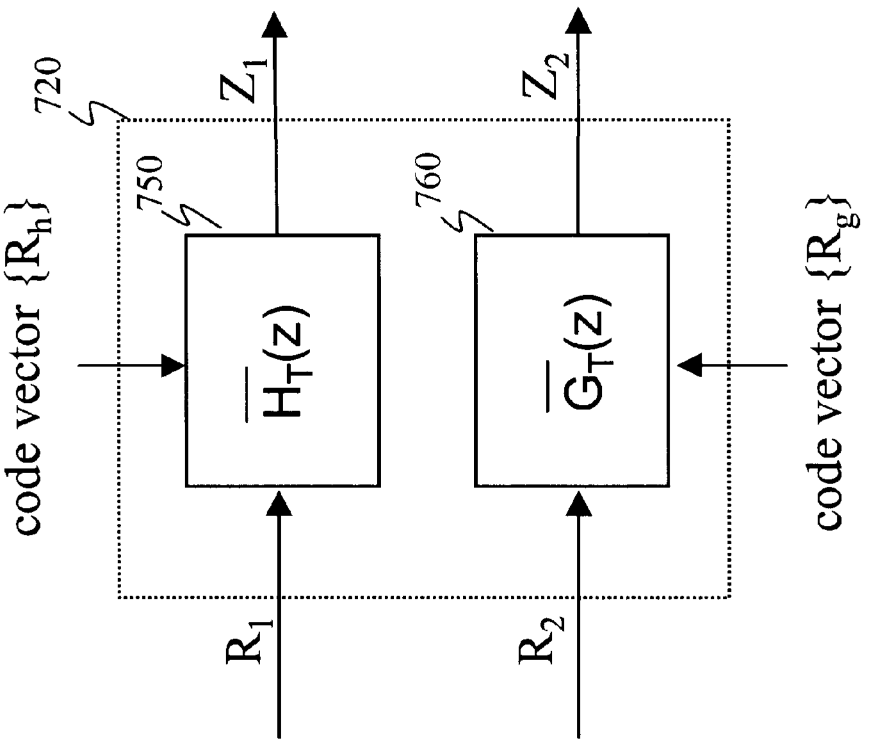
FIG. 12B is a block diagram of an uncovering module for a system according to the third embodiment of the invention.
Figure 12A:
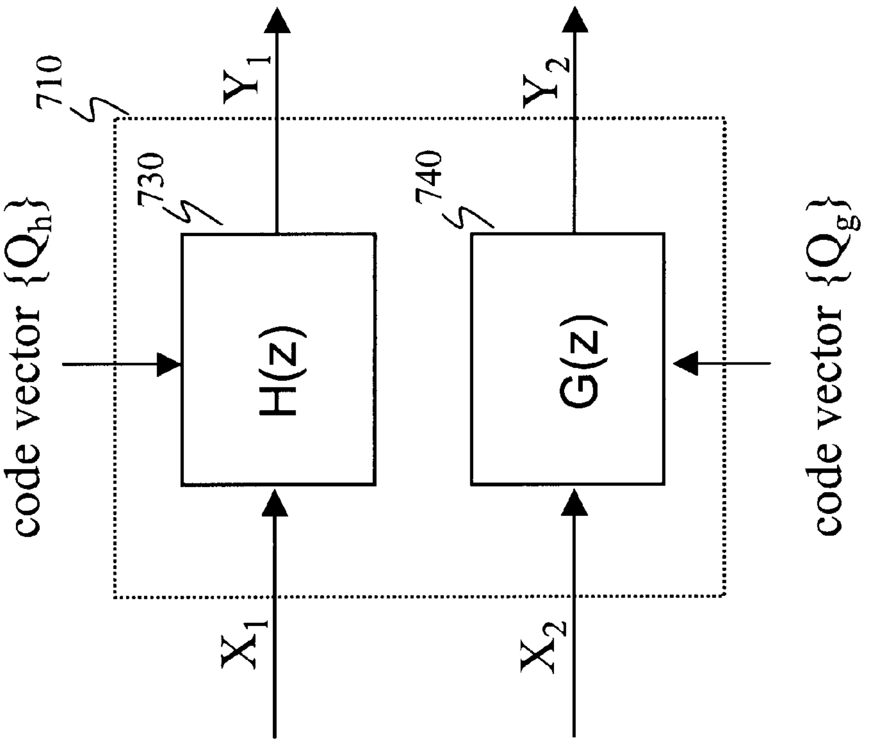
FIG. 12A is a block diagram of a covering module using IIR filters for a system according to a third embodiment of the invention.

A pair of covering and uncovering modules according to the third embodiment of the invention is depicted in FIGS. 12A and 12B. Covering module 710 employs two infinite-impulse-response (IIR) all-pass filters 730 and 740 having z-transform all-pass transfer functions H(z) and G(z), respectively, to process a pair of binary input sequences according to code matrices $\{Q_h\}$ and $\{Q_g\}$ as shown. The distinguishing characteristic of all-pass transfer functions is that they are stable functions which satisfy the paraunitary condition:

$$H(z)\tilde{H}(z)=c,\ G(z)\tilde{G}(z)=c \qquad (3)$$

where c>0 and the tilde denotes the paraconjugate operation as described above. Condition (3) is a scalar version of the property described in Condition (2) for matrices of transfer functions. On the unit circle defined by $z=e^{j\omega}$, this condition takes the form $$|H(e^{j\omega})|^2=c,\ |G(e^{j\omega})|^2=c \tag{4}$$

Thus, each of these transfer functions passes all sinusoidal sequences with equal gain. Note that G(z) may be selected independently of H(z) and in fact may be made equal to it.

Provided that the energetic component of the filter impulse responses is sufficiently long, the sequences outputted by all-pass filters 730 and 740 will be noise-like, having approximate Gaussian statistics as a result of the CLT. Moreover, since all-pass filters 730 and 740 have perfectly flat frequency responses and their outputs are uncorrelated (for uncorrelated input sequences), the spectrum of the aggregate (complex) output signal will also be perfectly flat.

As the matched filter for an IIR filter is nonrealizable, the corresponding uncovering module 720 comprises a pair of FIR filters 750 and 760 having transfer functions $\overline{H_T}(z)$ and $\overline{G_T}(z)$, respectively, which are matched to truncated versions of the infinitely long impulse responses of the covering module transfer functions. These truncated versions correspond to the energetic component of the impulse responses. Thus, the matched-filter transfer function $\overline{H_T}(z)$ approximates $\overline{H}(z)$ with a fixed delay, and the matched-filter transfer function $\overline{G_T}(z)$ approximates $\overline{G}(z)$ with a fixed delay. Application of the fixed delays, which correspond to the lengths of the respective energetic components, produces uncovering module filters that are realizable.

Figure 13A:
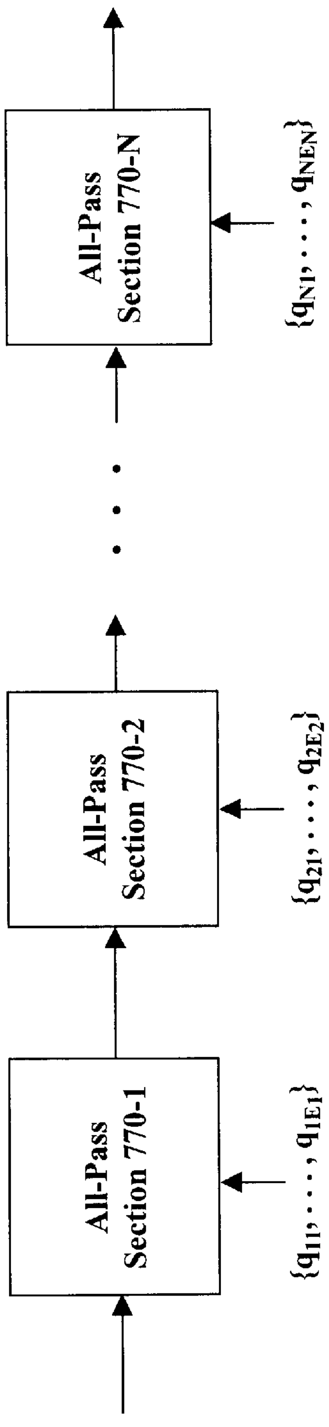
FIG. 13A shows a cascade of IIR all-pass sections.
Figure 13B:
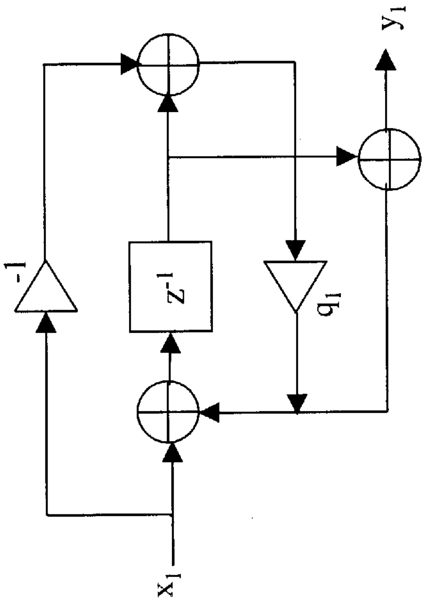
FIG. 13B shows a circuit diagram of a structurally lossless first-order IIR all-pass section.
Figure 13C:
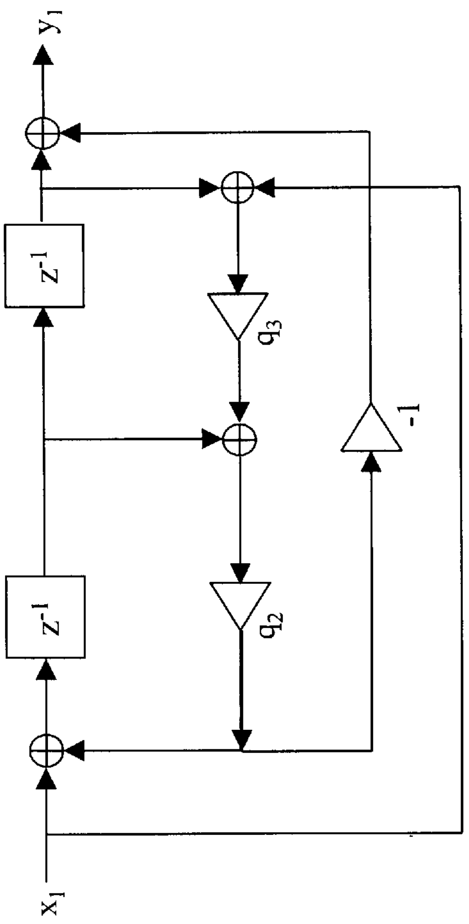
FIG. 13C shows a circuit diagram of a structurally lossless second-order IIR all-pass section.

The all-pass filters 730 and 740 that comprise covering module 710 may be implemented in a number of ways. For example, the blocks 730 and 740 which implement transfer functions H(z) and G(z), respectively, may each be realized as a cascade (as shown in FIG. 13A) of structurally lossless sections 770-1 through 770-N, each structurally lossless section comprising an all-pass section. Representative circuit diagrams for all-pass sections of first and second order are illustrated in FIGS. 13B and 13C, respectively, and all-pass sections are also described in reference SP.34. As noted above, the designation "structurally lossless" (SL) means that each structurally lossless section 770-i produces a transfer function that satisfies Conditions (3) and (4) for all choices of the internal multipliers $q_{ir}$ (with well-defined limits, where r is an integer from 1 to $E_i$ and $E_i$ is the order of the all-pass section 770-i). Thus a vector {Q} comprising the concatenation of the N vectors that contain the values of the multipliers $q_{ir}$ for each SL section 770-i can be used as the code for one of the covering module blocks 730 and 740. Different selections for {Q} produce different all-pass functions, and application of these vectors is indicated in FIG. 12A. Note that because of the different characters of the filters in the covering and uncovering modules, a covering code vector {Q} will typically be very different from the corresponding uncovering code vector {R}, where vectors {R} parameterize the operations of the uncovering filters as shown in FIG. 12B.

Figure 14A:
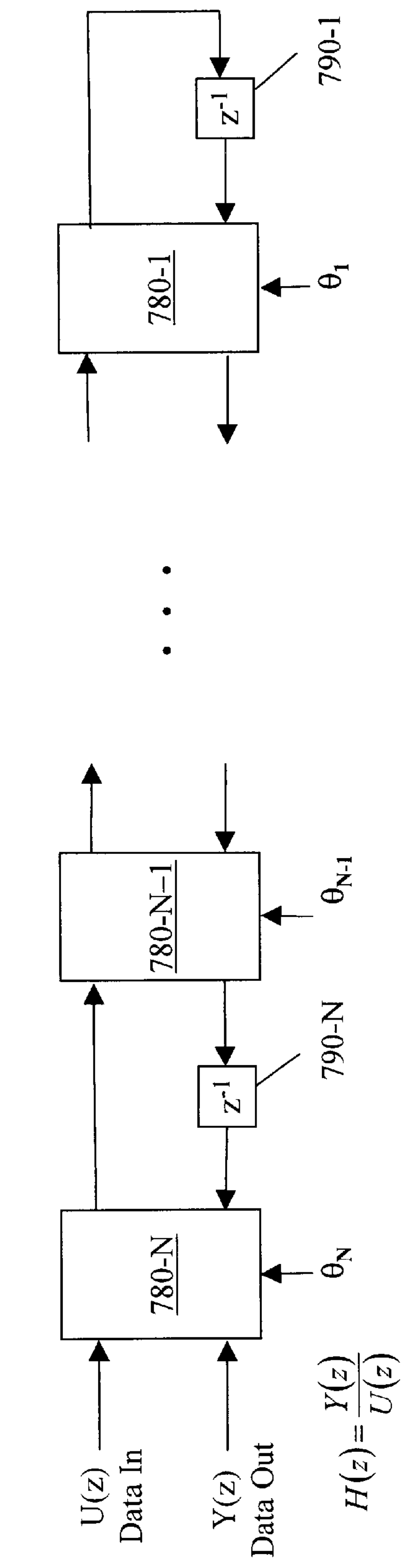
FIG. 14A shows an IIR filter using a cascade of lattice sections for a system according to the third embodiment of the invention.
Figure 14B:
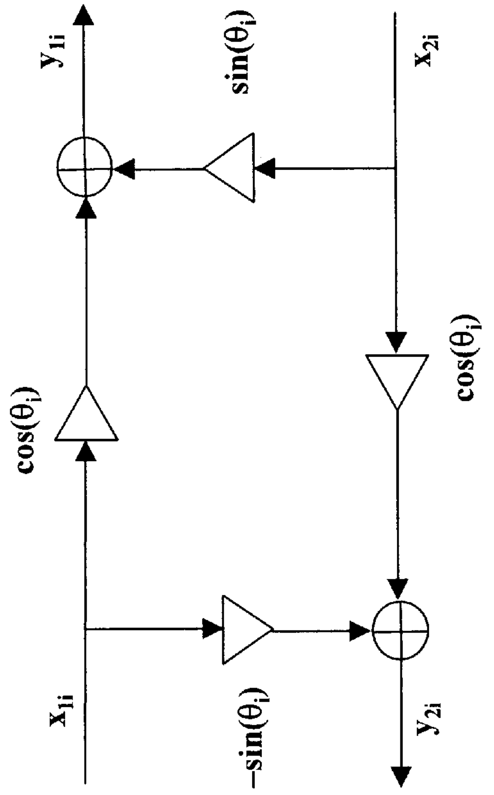
FIG. 14B shows a circuit diagram of an IIR lattice section parameterized by an angle θ.

Alternately, each of the all-pass transfer functions H(z) and G(z) may be realized as a cascade of rotation blocks 780-1 through 780-N interspersed with delay elements 790-1 through 790-N, as illustrated in FIG. 14A (as discussed in Section 3.4 of reference B.7 and reference SP.11). Each rotation block 780-i realizes a 2×2 orthogonal transfer matrix, as indicated in the following expression:

$$\begin{bmatrix} y_{1i} \\ y_{2i} \end{bmatrix} = \begin{bmatrix} \cos\theta_i & \sin\theta_i \\ -\sin\theta_i & \cos\theta_i \end{bmatrix} \begin{bmatrix} x_{1i} \\ x_{2i} \end{bmatrix}$$

The structure can be regarded as performing a rotational transformation on its inputs $x_{1i}$ and $x_{2i}$ to produce its outputs $y_{1i}$ and $y_{2i}$ with the rotation parameterized by the angle $\theta_i$. Thus, in this case a vector {θ} having as its elements the values of the angles $\theta_1, \ldots, \theta_N$ can be used as the code for the covering module. Again, the parametric vector {θ} may be randomly selected and also changed from time to time for CSN applications.

Phase Shift Compensation

In a typical CSN application of one among the above-described embodiments of the invention, the covering module accepts two input data sequences and generates two signals for modulation onto the in-phase and quadrature components, respectively, of an RF carrier, and the uncovering module reconstructs the input data streams from the in-phase and quadrature components of the demodulated signal. Under ideal (e.g., noiseless) conditions, the sequences outputted by the uncovering module will be scaled, delayed, and phase-rotated versions of the corresponding input sequences, along with some ISI. Elimination of the phase shift will reduce, and in some cases eliminate, the ISI. For embodiments based on structurally lossless FIR designs, for example, the ISI is reduced to zero in the ideal case.

Referring to FIGS. 2A and 2B, note that in the absence of noise and demodulation error, the quantities $R_1$ and $R_2$ at the receiver will ideally be equivalent to the quantities $Y_1$ and $Y_2$ at the transmitter, respectively. This situation will only occur, however, if the transmitter and the receiver observe the same phase reference. In most practical implementations, the integrity of the two reconstructed signals will be compromised by the presence of ISI, which arises because of phase differences between the outputs of transmitter and receiver local oscillators 250 and 290, respectively, relative to the transmission path delay.

A phase shift may arise, for example, when the length of the transmission path changes for any reason, such as movement of the transmitter or the receiver or an object in the environment. At the high frequencies commonly used in wireless applications, the wavelength of the carrier is so short that even a small change in path length can cause a significant phase shift. At a relatively low frequency of 100 MHz, for example, a quarter wavelength (corresponding to the 90-degree phase shift that separates the I and Q components of the transmitted signal) measures only 75 cm. In many practical wireless applications, therefore, it is desirable to identify the phase angle of the carrier in order to remove the phase shift (i.e. the rotation of the phase vector) incurred during transmission.

Techniques for determining or estimating carrier phase are well known in the art and are most commonly used to enable coherent demodulation (as discussed in reference B.8). However, these techniques typically depend upon the fact that in conventional CSN approaches, phase errors do not destroy the desired signal information but merely reformat it in a way that allows it to be recovered in a straightforward manner from the received and decoded signals. When the transmitted signals are generated by covering functions of the type described herein, this situation may no longer exist.

A further refinement of the invention therefore allows for estimation of the phase error. An example configuration employs two identical uncovering modules at the receiver.

Each uncovering module is driven by a different version of the complex baseband signal produced by the RF demodulator, in that the two versions differ from each other by a 90-degree phase shift. If there is no transmit/receive phase offset, then one of the two uncovering modules will produce the correct signals (plus receiver noise) while the other will deliver outputs consisting only of noise plus inter-symbol interference (ISI). If there is a 90-degree phase error, then the other uncovering module will produce the desired outputs while the first one will deliver noise and ISI. Phase angle offsets between 0 and 90 degrees (i.e. between 0 and $\pi/2$ radians) will cause the outputs of each module to contain both signal and ISI in proportionate amounts. In such case, full recovery of the signal is possible either by adjusting the phase of the receiver local oscillator or by adding the outputs of the two modules in corresponding proportions.

Figure 15:
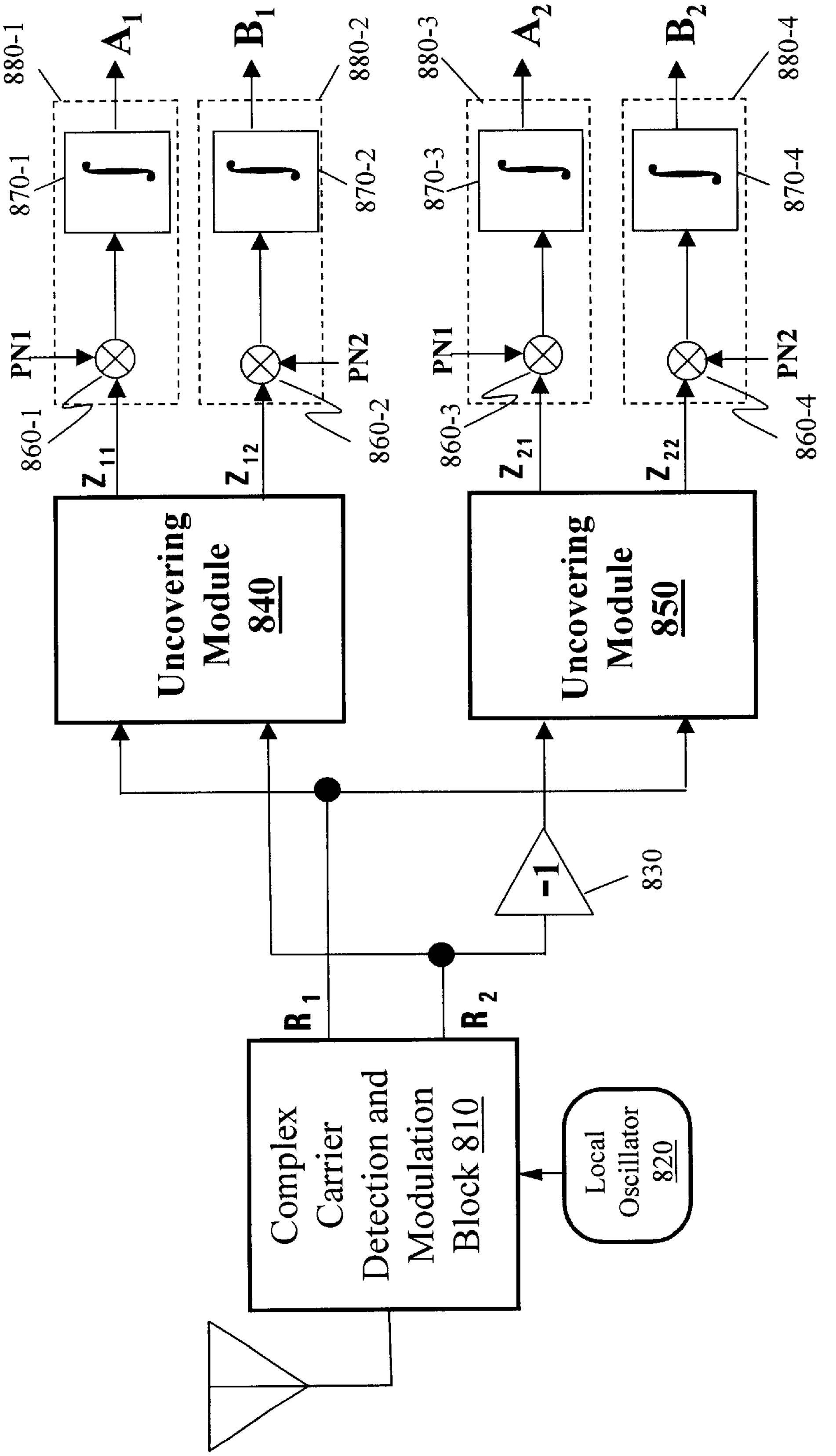
FIG. 15 shows a block diagram for a receiver that enables estimation of a phase shift between the received signal and the waveform of local oscillator 820.

FIG. 15 shows a receiver configuration that contains two identical uncovering modules 840 and 850, where PN decoders 860-1 through 860-4 and integrators 870-1 through 870-4 serve as matched filters 880-1 through 880-4 for the PN-DSSS spreading codes that were applied at the transmitter prior to covering (see, e.g., FIG. 2A). Note that the outputs of matched filters 880-1 through 880-4 are sampled at the information bit rate of the system, whereas the inputs to these matched filters are sampled at the higher chip rate. Matched filters 880-1 through 880-4 thus provide a processing gain which is proportional to this sampling rate reduction factor.

In a typical CSN application, the input to the receiver will be expected to have a low signal-to-noise ratio. Additionally, in such an application where one of the above-described embodiments is used, it will usually be difficult to recognize the difference between the data signal and the ISI at the outputs of the uncovering module or modules. The PN-DSSS matched filters 880-1 through 880-4 shown in FIG. 15, therefore, perform an important function in the process of gaining a valid estimate of the phase shift, as these filters provide signal processing gain which increases the signal-to-noise and signal-to-interference ratios of the desired signal components. The amount of signal received at output point $A_1$ will be proportional to the cosine of the phase shift angle, whereas the amount at $A_2$ will be proportional to the sine. The same is true, and in the same proportions, for the output signals $B_1$ and $B_2$. Thus, the phase angle may be estimated from the amplitude values observed at these four points.

Once the phase angle has been estimated, corrective measures should be taken. Several such measures are well known in the art. One way to accomplish the phase correction is to adjust the phase of the receiver local oscillator 820 based on the angle estimate. A system of this type involves a feedback path, i.e., from the downstream phase estimation point back to the upstream local oscillator 820. The object of the feedback mechanism would be to adjust the phase angle, for example, to maintain all of the desired signal energy in the $A_1$ and $B_1$ outputs while keeping all the ISI in the $A_2$ and $B_2$ paths.

Figure 16:
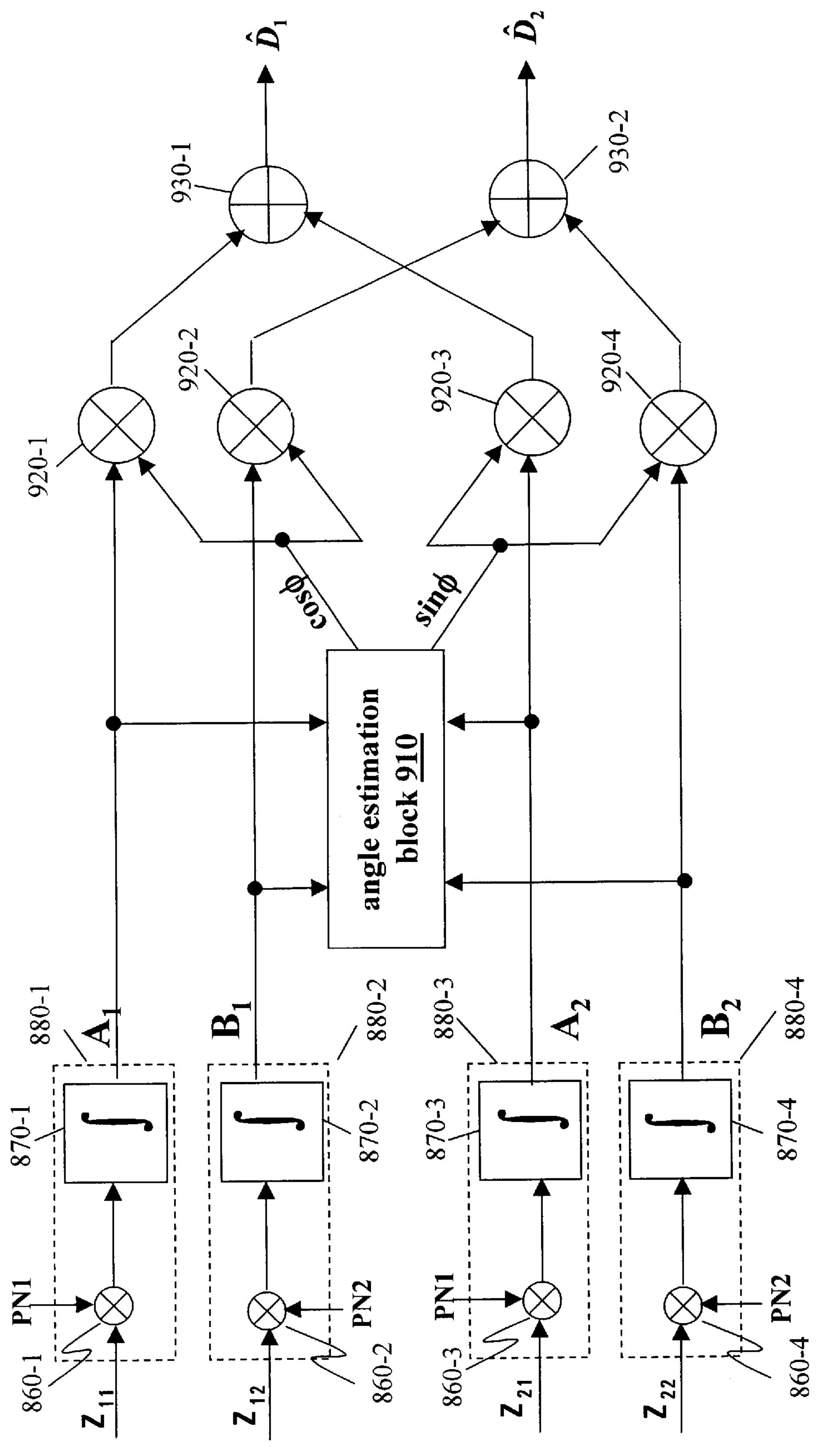
FIG. 16 indicates a feed-forward method for correcting the carrier phase shift error.

A second method of phase correction, as illustrated in FIG. 16, would be to combine the $A_1$ and $A_2$ outputs in proportion to the cosine and sine, respectively, of the phase shift as estimated by angle estimation block 910. Such combination is performed using multipliers 920-1 and 920-2 and adder 930-1 to produce a first decoded and de-spread data stream. By combining the $B_1$ and $B_2$ outputs separately and in the same proportion, using multipliers 920-3 and 920-4 and adder 930-2, a second such stream is generated. These two output data streams $\hat{D}_1$ and $\hat{D}_2$ as shown in FIG. 16 are the phase-corrected receiver estimates of the input baseband data streams $D_1$ and $D_2$ that were applied to a transmitter such as shown in FIG. 2A. The choice between a feed-forward technique of this type or the above-described feedback approach will depend on system level and engineering implementation considerations.

The foregoing description of the preferred embodiments is provided to enable any person skilled in the art to make or use the present invention. Various modifications to these embodiments will be readily apparent to those skilled in the art, and the generic principles presented herein may be applied to other embodiments without use of the inventive faculty. For example, it will be understood by one of ordinary skill in the art that the optimizing techniques described herein in relation to covering modules, and all equivalents of such techniques, may be applied with equal efficacy to uncovering modules. Thus, the present invention is not intended to be limited to the embodiments shown above but rather is to be accorded the widest scope consistent with the principles and novel features disclosed in any fashion herein.

REFERENCES

Reference Books

B.1 Kailath, *T. Linear Systems,* Prentice Hall, Inc., Englewood Cliffs, N.J., 1980.

B.2 Oppenheim, A. V., and Schafer, R. W. *Digital signal processing,* Prentice Hall, Inc., Englewood Cliffs, N.J., 1975.

B.3 Oppenheim, A. V., Willsky, A. S., and Young, 1. T. *Signals and systems,* Prentice Hall, Inc., Englewood Cliffs, N.J., 1983.

B.4 Oppenheim, A. V., and Schafer, R. W. *Discrete-time signal processing,* Prentice Hall, Inc., Englewood Cliffs, N.J., 1989.

B.5 Rabiner, L. R., and Gold, B. *Theory and application of digital signal processing,* Prentice Hall, Inc., Englewood Cliffs, N.J., 1975.

B.6 Vetterli, M. and Kovacevic, J. *Wavelets and Sub-Band Coding,* Prentice Hall, Inc., Englewood Cliffs, N.J., 1995.

B.7 Vaidyanathan, P. P. *Multirate Systems and Filter Banks,* Prentice Hall, Inc., Englewood Cliffs, N.J., 1993.

B.8 Gitlin, R. D., Hayes, J. F., and Weinstein, S. B. *Data Communications Principles,* Plenum Press, New York, N.Y., 1992.

B.9 Rappaport, T. S. *Wireless Communications*, Section 6.11, IEEE Press, 1996.

B.10 Meyer, P. L. *Introductory Probability and Statistical Applications,* Section 12.4, Addison Wesley, 1970.

B.11 Taub, H., Schilling, D. L. *Principles of Communication Systems,* Section 11.4, McGraw Hill, New York, N.Y., 1971.

Signal Processing Journal Articles

SP.1 Deprettere, E., Dewilde, P. "Orthogonal cascade realization of real multiport digital filters," *Int. J. Circuit Theory and Appl.*, vol. 8, pp. 245–277, 1980.

SP.2 Doganata, Z., and Vaidyanathan, P. P. "On one-multiplier implementations of FIR lattice structures," *IEEE Trans. on Circuits and Systems,* vol. CAS-34, pp. 1608–1609, December 1987.

SP.3 Doganata, Z., Vaidyanathan, P. P., and Nguyen, T. Q. "General synthesis procedures for FIR lossless transfer matrices, for perfect-reconstruction multirate filter bank applications," *IEEE Trans. on Acoustics, Speech and Signal Proc.,* vol. ASSP-36, pp. 1561–1574, October 1988.

SP.4 Doganata, Z., Vaidyanathan, P. P. "Minimal structures for the implementation of digital rational lossless systems," *IEEE Trans. Acoustics, Speech and Signal Proc.,* vol. ASSP-38, pp. 2058–2074, December 1990.

SP.5 Esteban, D., and Galand, C. "Application of quadrature mirror filters to split band voice coding schemes, Proc." *IEEE Int. Conf Acoust. Speech, and Signal Proc.,* pp. 191–195, May 1977.

SP.6 Fettweis, A. "Digital filter structures related to classical filter networks," *AEU,* vol. 25, pp.79–89, February 1971.

SP.7 Fettweis, A. "Wave digital lattice filters," *Int. J. Circuit Theory and Appl.,* vol. 2, pp. 203–211, June 1974.

SP.8 Fettweis, A., Leickel, T., Bolle, M., Sauvagerd, U. "Realization of filter banks by means of wave digital filters," *Proc. IEEE Int. Symp. Circuits and Sys.,* pp. 2013–2016, New Orleans, May 1990.

SP.9 Galand, C., and Esteban, D. "16 Kbps real-time QMF subband coding implementation," *Proc. Int. Conf. on Acoust. Speech and Signal Proc.,* pp. 332–335, Denver, Colo., April 1980.

SP.10 Galand, C. R., and Nussbaumer, H. J. "New quadrature mirror filter structures," *IEEE Trans. Acoustics, Speech and Signal Proc.,* vol. ASSP-32, pp. 522–531, June 1984.

SP.11 Gray, Jr., A. H., and Markel, J. D. "Digital Lattice and Ladder Filter Synthesis," *IEEE Trans. on Audio, Electroacoustics,* vol. AU-21, December 1973.

SP.12 Gray, Jr., A. H. "Passive cascaded lattice digital filters," *IEEE Trans. on Circuits and Systems,* vol. CAS-27, pp. 337–344, May 1980.

SP.13 Herrmann, O., and Schussler, W. "Design of nonrecursive digital filters with minimum phase," *Electronics Letters,* vol. 6, pp. 329–330, May 1970.

SP.14 Horng, B-R., Samueli, H., and Willson, A. N., Jr. "The design of low-complexity linear phase FIR filter banks using powers-of-two coefficients with an application to subband image coding," *IEEE Trans. Circuits and Syst. for Video Technology,* vol. 1, pp. 318–324, December 1991.

SP.15 Horng, B-R., and Willson, A. N., Jr. "Lagrange multiplier approaches to the design of two-channel perfect reconstruction linear phase FIR filter banks," *IEEE Trans. Signal Processing,* vol. 40, pp. 364–374, February 1992.

SP.16 Johnston, J. D., "A filter family designed for use in quadrature mirror filter banks," *Proc. IEEE Int. Conf Acoust. Speech and Signal Proc.,* pp. 291–294, April 1980.

SP.17 Kaiser, J. F. "Design subroutine (MXFLAT) for symmetric FIR lowpass digital filters with maximally flat pass and stop bands," in *Programs for digital signal processing,* IEEE Press, N.Y., 1979.

SP.18 Koilpillai, R. D. and Vaidyanathan, P. P. "New results on cosine-modulated FIR filter banks satisfying perfect reconstruction," *Proc. IEEE Int. Conf. Acoust. Speech and Signal Proc.,* pp. 1793–1796, Toronto, Canada, May 1991a.

SP.19 Koilpillai, R. D. and Vaidyanathan, P. P. "A spectral factorization approach to pseudo-QMF design," *Proc. IEEE Int. Symp. Circuits and Sys.,* pp. 160–163, Singapore, June 1991b.

SP.20 Koilpillai, R. D. and Vaidyanathan, P. P. "Cosine-modulated FIR filter banks satisfying perfect reconstruction," *IEEE Trans. on Signal Processing,* vol. SP-40, pp. 770–83, April 1992.

SP.21 Kung, S. Y., Whitehouse, H. J., and Kailath, T. *VLSI and modern signal processing,* Prentice Hall, Inc., Englewood Cliffs, N.J., 1985.

SP.22 Liu, V. C., and Vaidyanathan, P. P. "On the factorization of a subclass of 2-D digital FIR lossless matrices for 2-D QMF bank applications," *IEEE Trans. on Circuits and Systems,* vol. CAS-37, pp. 852–854, June 1990.

SP.23 Makhoul, J. "Linear prediction: a tutorial review," *Proc. IEEE, vol.* 63, pp. 561–580, 1975.

SP.24 Malvar, H. S., and Staelin, D. H. "The LOT: Transform coding without blocking effects," *IEEE Trans. Acoust., Speech, Signal Proc.,* vol. ASSP-37, pp. 553–559, April, 1989.

SP.25 Malvar, H. S. "Lapped transforms for efficient transform/subband coding," *IEEE Trans. Acoust., Speech, Signal Proc.,* vol. ASSP-38, pp. 969–978, June 1990a.

SP.26 Malvar, H. S. "Modulated QMF filter banks with perfect reconstruction," *Electronics Letters,* vol. 26, pp. 906–907, June 1990b.

SP.27 Malvar, H. S. "Extended lapped transforms: fast algorithms and applications," Proc. *IEEE Int. Conf. on Acoustics, Speech and Signal Proc.,* pp. 1797–1800, Toronto, Canada, May, 1991.

SP.28 Malvar, H. S. *Signal processing with lapped transforms, Artech House,* Norwood, Mass., 1992.

SP.29 Markel, J. D., and Gray, A. H., Jr. *Linear prediction of speech,* Springer-Verlag, New York, 1976.

SP.30 Marshall, Jr., T. G. "Structures for digital filter banks," Proc. IEEE Int. Conf. on Acoustics, Speech and Signal Proc., pp. 315–318, Paris, April 1982.

SP.31 McClellan, J. H., and Parks, T. W. "A unified approach to the design of optimum FIR linear-phase digital filters," *IEEE Trans. Circuit Theory,* vol. CT-20, pp. 697–701, November 1973.

SP.32 Mintzer, F. "On half-band, third-band and Nth band FIR filters and their design," *IEEE Trans. on Acoustics, Speech and Signal Proc.,* vol. ASSP-30, pp. 734–738, October 1982.

SP.33 Mintzer, F. "Filters for distortion-free two-band multirate filter banks," *IEEE Trans. on Acoustics, Speech and Signal Proc.,* vol. ASSP-33, pp. 626–630, June 1985.

SP.34 Mitra, S. K., and Hirano, K. "Digital allpass networks," *IEEE Trans. on Circuits and Syst.,* vol. CAS-21, pp. 688–700, September 1974.

SP.35 Mitra, S. K., and Gnanasekaran, R. "Block implementation of recursive digital filters: new structures and properties," *IEEE Trans. Circuits and Sys.,* vol. CAS-25, pp. 200–207, April 1978.

SP.36 Mou, Z. J., and Duhamel, P. "Fast FIR filtering: algorithms and implementations," *Signal Processing,* vol. 13, pp. 377–384, December 1987.

SP.37 Nayebi, K., Barnwell, III, T. P. and Smith, M. J. T. "A general time domain analysis and design framework for exact reconstruction FIR analysis/synthesis filter banks," Proc. IEEE Int. Symp. Circuits and Sys., pp. 2022–2025, New Orleans, May 1990.

SP.38 Nayebi, K., Barnwell, III, T. P. and Smith, M. J. T. "The design of perfect reconstruction nonuniform band filter banks," Proc. IEEE Int. Conf. Acoust. Speech and Signal Proc., pp. 1781–1784, Toronto, Canada, May 1991a.

SP.39 Nayebi, K., Barnwell, III, T. P. and Smith, M. J. T. "Nonuniform filter banks: a reconstruction and design theory," *IEEE Trans. on Signal Proc.,* vol. SP-41, June 1993.

SP.40 Nguyen, T. Q., and Vaidyanathan, P. P. "Maximally decimated perfect-reconstruction FIR filter banks with pairwise mirror-image analysis (and synthesis) frequency responses," *IEEE Trans. on Acoust. Speech and Signal Proc.,* vol. ASSP-36, pp. 693–706, May 1988.

SP.41 Nguyen, T. Q., and Vaidyanathan, P. P. "Structures for M-channel perfect reconstruction FIR QMF banks which yield linear-phase analysis filters," *IEEE Trans. on Acoustics, Speech And Signal Processing,* vol. ASSP-38, pp. 433–446, March 1990.

SP.42 Nguyen, T. Q. "A class of generalized cosine-modulated filter bank," Proc. IEEE Int. Symp., Circuits and Sys., pp. 943–946, San Diego, Calif., May 1992b.

SP.43 Parks, T. W., and McClellan, J. H. "Chebyshev approximation for nonrecursive digital filters with linear phase," *IEEE Trans. on Circuit Theory,* vol. CT-19, pp. 189–194, March 1972.

SP.44 Prabhakara Rao, C. V. K., and Dewilde, P. "On lossless transfer functions and orthogonal realizations," *IEEE Trans. on Circuits and Systems,* vol. CAS-34, pp. 677–678, June 1987.

SP.45 Rabiner, L. R., McClellan, J. H., and Parks, T. W. "FIR digital filter design techniques using weighted Chebyshev approximation," *Proc. IEEE,* vol. 63, pp. 595–610, April 1975.

SP.46 Rao, S. K., and Kailath, T. "Orthogonal digital lattice filters for VLSI implementation," *IEEE Trans. on Circuits and Systems, vol. CAS*-31, pp. 933–945, November 1984.

SP.47 Regalia, P. A., Mitra, S. K., and Vaidyanathan, P. P. "The digital allpass filter: a versatile signal processing building block," *Proc. IEEE,* vol. 76, pp. 19–37, January 1988.

SP.48 Saramaki, T. "On the design of digital filters as a sum of two allpass filters," *IEEE Trans. on Circuits and Systems,* vol. CAS-32, pp. 1191–1193, November 1985.

SP.49 Sathe, V., and Vaidyanathan, P. P. "Analysis of the effects of multirate filters on stationary random inputs, with applications in adaptive filtering," Proc. IEEE Int. Conf. Acoust. Speech and Signal Proc., pp. 1681–1684, Toronto, Canada, May 1991.

SP.50 Sathe, V., and Vaidyanathan, P. P. "Effects of multirate systems on the statistical properties of random signals," *IEEE Trans. on Signal Processing,* vol. ASSP-41, pp. 131–146, January 1993.

SP.51 Schafer, R. W., Rabiner, L. R., and Herrmann, 0. "FIR digital filter banks for speech analysis," *Bell Syst. Tech. J,* vol. 54, pp. 531–544, March 1975.

SP.52 Simoncelli, E. P., and Adelson, E. H. "Nonseparable extensions of quadrature mirror filters to multiple dimensions," *Proc. IEEE,* vol. 78, pp. 652–664, April 1990.

SP.53 Smith, M. J. T., and Barnwell III, T. P. "A procedure for designing exact reconstruction filter banks for tree structured subband coders," Proc. IEEE Int. Conf. Acoust. Speech, and Signal Proc., pp. 27.1.1–27.1.4, San Diego, Calif., March 1984.

SP.54 Smith, M. J. T., and Barnwell III, T. P. "A unifying framework for analysis/synthesis systems based on maximally decimated filter banks," Proc. IEEE Int. Conf. Acoust. Speech, and Signal Proc., pp. 521–524, Tampa, Fla., March 1985.

SP.55 Soman, A. K., and Vaidyanathan, P. P. "Paraunitary filter banks and wavelet packets," Proc. IEEE Int. Conf. Acoust. Speech, and Signal Proc., San Francisco, March 1992a.

SP.56 Soman, A. K., Vaidyanathan, P. P., and Nguyen, T. Q. "Linear phase paraunitary filter banks: theory, factorizations and applications," *IEEE Trans. on Signal Processing,* vol. SP-41, December 1993.

SP.57 Soman, A. K., and Vaidyanathan, P. P. "On orthonormal wavelets and paraunitary filter banks," *IEEE Trans. on Signal Processing,* vol. SP-41, March 1993.

SP.58 Swarninathan, K., and Vaidyanathan, P. P. "Theory and design of uniform DFT, parallel, quadrature mirror filter banks," *IEEE Trans. on Circuits and Systems,* vol. CAS-33, pp. 1170–1191, December 1986.

SP.59 Szczupak, J., Mitra, S. K., and Fadavi-Ardekani, J. "A computer-based method of realization of structurally LBR digital allpass networks," *IEEE Trans. on Circuits and Systems,* vol. CAS-35, pp. 755–760, June 1988.

SP.60 Tan, S., and Vandewalle, J. "Fundanental factorization theorems for rational matrices over complex or real fields," Proc. IEEE Int. Symp. on Circuits and Syst., pp. 1183–1186, Espoo, Finland, June 1988.

SP.61 Vaidyanathan, P. P., and Mitra, S. K. "Low passband sensitivity digital filters: A generalized viewpoint and synthesis procedures," *Proc. of the IEEE,* vol. 72, pp. 404–423, April 1984.

SP.62 Vaidyanathan, P. P. "A unified approach to orthogonal digital filters and wave digital filters, based on LBR two-pair extraction", *IEEE Trans. on Circuits and Systems,* vol. CAS-32, pp. 673–686, July 1985a.

SP.63 Vaidyanathan, P. P. "The discrete-time bounded-real lemma in digital filtering," *IEEE Trans. on Circuits and Systems,* vol. CAS-32, pp. 918–924, September 1985b.

SP.64 Vaidyanathan, P. P., and Mitra, S. K. "A general family of multivariable digital lattice filters," *IEEE Trans. on Circuits and Systems,* vol. CAS-32, pp. 1234–1245, December 1985.

SP.65 Vaidyanathan, P. P., Mitra, S. K., and Neuvo, Y. "A new approach to the realization of low sensitivity IIR digital filters," *IEEE Trans. on Acoustics, Speech and Signal Processing,* vol. ASSP-34, pp. 350–361, April 1986.

SP.66 Vaidyanathan, P. P. "Passive cascaded lattice structures for low sensitivity FIR filter design, with applications to filter banks," *IEEE Trans. on Circuits and Systems,* vol. CAS-33, pp. 1045–1064, November 1986.

SP.67 Vaidyanathan, P. P., and Nguyen, T. Q. "Eigenfilters: a new approach to least squares FIR filter design and applications including Nyquist filters," *IEEE Trans. on Circuits and Systems,* vol. CAS-34, pp. 11–23, January 1987a.

SP.68 Vaidyanathan, P. P., and Nguyen, T. Q. "A trick for the design of FIR half-band filters," *IEEE Trans. on Circuits and Systems,* vol. CAS-34, pp. 297–300, March 1987b.

SP.69 Vaidyanathan, P. P., Regalia, P., and Mitra, S. K. "Design of doubly complementary IIR digital filters using a single complex allpass filter, with multirate applications," *IEEE Trans. on Circuits and Systems,* vol. CAS-34, pp. 378–389, April 1987.

SP.70 Vaidyanathan, P. P., and Mitra, S. K. "A unified structural interpretation of some well-known stability-test procedures for linear systems," *Proc. of the IEEE,* vol. 75, pp. 478–497, April 1987.

SP.71 Vaidyanathan, P. P. "Theory and design of M-channel maximally decimated quadrature mirror filters with arbitrary M, having perfect reconstruction property," *IEEE Trans. on Acoustics, Speech and Signal Processing,* vol. ASSP-35, pp. 476–492, April 1987a.

SP.72 Vaidyanathan, P. P. "Quadrature mirror filter banks, M-band extensions and perfect-reconstruction techniques," *IEEE ASSP magazine,* vol. 4, pp. 4–20, July 1987b.

SP.73 Vaidyanathan, P. P. "Design and implementation of digital FIR filters," in *Handbook on Digital Signal Processing,* edited by D. F. Elliott, Academic Press Inc., pp. 55–172, 1987c.

SP.74 Vaidyanathan, P. P., and Hoang, P.-Q. "Lattice structures for optimal design and robust implementation of two-channel perfect reconstruction QMF banks," *IEEE*

*Trans. on Acoustics, Speech and Signal Processing,* vol. ASSP-36, pp. 81–94, January 1988.

SP.75 Vaidyanathan, P. P., and Mitra, S. K. "Polyphase networks, block digital filtering, LPTV systems, and alias-free QMF banks: a unified approach based on pseudocirculants," *IEEE Trans. Acoust., Speech, Signal Proc.,* vol. ASSP-36, pp. 381–391, March 1988.

SP.76 Vaidyanathan, P. P., Nguyen, T. Q., Doganata, Z., and Saramaki, T. "Improved technique for design of perfect reconstruction FIR QMF banks with lossless polyphase matrices," *IEEE Trans. on Acoustics, Speech and Signal Proc.,* vol. ASSP-37, pp. 1042–1056, July 1989.

SP.77 Vaidyanathan, P. P., and Doganata, Z. "The role of lossless systems in modern digital signal processing: a tutorial," Special issue on Circuits and Systems, *IEEE Trans. on Education,* pp. 181–197, August 1989.

SP.78 Vaidyanathan, P. P. "Multirate digital filters, filter banks, polyphase networks, and applications: a tutorial," *Proc. of the IEEE,* vol. 78, pp. 56–93, January 1990.

SP.79 Vaidyanathan, P. P. "How to capture all FIR perfect reconstruction QMF banks with unimodular matrices?" Proc. IEEE Int. Symp. Circuits and Sys., pp. 2030–2033, New Orleans, May 1990.

SP.80 Vaidyanathan, P. P., and Liu, V. C. "Efficient reconstruction of bandlimited sequences from nonuniformly decimated versions by use of polyphase filter banks," *IEEE Trans. on Acoust. Speech and Signal Proc.,* vol. ASSP-38, pp. 1927–1936, November 1990.

SP.81 Vaidyanathan, P. P. "Lossless systems in wavelet transforms," Proc. of the IEEE Int. Symp. on Circuits and Systems, pp. 116–119, Singapore, June 1991.

SP.81 Vetterli, M. "Filter banks allowing for perfect reconstruction," *Signal Processing,* vol. 10., pp. 219–244, April 1986.

SP.82 Vetterli, M. "Perfect transmultiplexers," Proc. IEEE Int. Conf. Acoust. Speech and Signal Proc., pp. 2567–2570, Tokyo, Japan, April 1986.

SP.83 Vetterli, M. "A theory of multirate filter banks," *IEEE Trans. Acoust. Speech and Signal Proc.,* vol. ASSP-35, pp. 356–372, March 1987.

SP.84 Vetterli, M. "Running FIR and IIR filtering using multirate filter banks," *IEEE Trans. Acoust. Speech and Signal Proc.,* vol. ASSP-36, pp. 730–738, May 1988.

SP.85 Vetterli, M., and Le Gall, D. "Analysis and design of perfect reconstruction filter banks satisfying symmetry constraints," Proc. Princeton Conf. Inform. Sci. Syst., pp. 670–675, March 1988.

SP.86 Vetterli, M., and Le Gall, D. "Perfect reconstruction FIR filter banks: some properties and factorizations," *IEEE Trans. on Acoustics, Speech and Signal Processing,* vol. ASSP-37, 1057–1071, July 1989.

SP.87 Vetterli, M., and Herley, C. "Wavelets and filter banks," *IEEE Trans. on Signal Processing,* vol. SP-40, 1992.

SP.88 Viscito, E., and Allebach, J. "The design of tree-structured M-channel filter banks using perfect reconstruction filter blocks," Proc. of the IEEE Int. Conf. on ASSP, pp. 1475–1478, New York, April 1988a.

SP.89 Viscito, E., and Allebach, J. "Design of perfect reconstruction multidimensional filter banks using cascaded Smith form matrices," Proc. of the IEEE Int. Symp. on Circuits and Systems, Espoo, Finland, pp. 831–834, June 1988.

SP.90 Viscito, E., and Allebach, J. P. "The analysis and design of multidimensional FIR perfect reconstruction filter banks for arbitrary sampling lattices," *IEEE. Trans. on Circuits and Systems,* vol. CAS-38, pp. 29–41, January 1991.

SP.91 Wackersreuther, G. "On two-dimensional polyphase filter banks," *IEEE Trans. on Acoustics, Speech and Signal Proc.,* vol. ASSP-34, pp. 192–199, February 1986a.

SP.92 Wackersreuther, G. "Some new aspects of filters for filter banks," *IEEE Trans. on Acoustics, Speech and Signal Proc.,* vol. ASSP-34, pp. 1182–1200, October 1986b.

SP.93 Zou, H., and Tewfik. A. H., "Design and parameterization of M-band orthonormal wavelets," Proc. IEEE Int. Symp. Circuits and Sys., pp. 983–986, San Diego, Calif., 1992.

References on Signal Detection

SD1. Scholtz, R. A., "The Origins of Spread-Spectrum Communications," *IEEE Trans. on Comm.,* Vol. COM-30, No. 5, May 1982.

SD2. Pickholtz, R. L., Schilling, D. L., and Milstein, L. B., "Theory of Spread-Spectrum Communications: A Tutorial," *IEEE Trans. on Comm., vol. COM*-30, No. 5, May 1982.

SD3. Nicholson, D. L., *Spread Spectrum Signal Design: LPE and AJ Systems,* Computer Science Press (an imprint of W. H. Freeman and Company), New York, N.Y., 1988.

SD4. Gardner, W. A., *Statistical Spectral Analysis: A Nonprobabilistic Theory,* Prentice Hall, Englewood Cliffs, N.J., 1988.

SD5. Gardner, W. A., ed. *Cyclostationarity in Communications and Signal Processing,* IEEE Press, New York, N.Y., 1994.

SD6. Ready, et al., "Modulation Detector and Classifier", U.S. Pat. No. 4,597,107, Jun. 24, 1986.

SD7. Gardner, W. A., "Signal Interception: A Unifying Theoretical Framework for Feature Detection," *IEEE Trans. on Comm.,* vol. 36, no. 8, August 1988.

SD8. Gardner, W. A. and Spooner, C. M., "Signal Interception: Performance Advantages of Cyclic-Feature Detectors," *IEEE Trans. on Comm.,* vol. 40, no. 1, January 1992.

SD9. Imbeaux, J. C., "Performances of the Delay-Line Multiplier Circuit for Clock and Carrier Synchronization in Digital Satellite Communications," *IEEE Journal on Selected Areas in Comm.,* vol. Sac-1, January 1983.

SD1 . Kuehls, J. F. and Geraniotis, E., "Presence Detection of Binary-Phase-Shift-Keyed and Direct-Sequence Spread-Spectrum Signals Using a Prefilter-Delay-and-Multiply Device," *IEEE Journal on Selected Areas in Comm.,* vol. 8, no. 5, June 1990.

SD11. Sonnenschein, A. and Fishman, P. M., "Limitations on the Detectability of Spread-Spectrum Signals," *IEEE MILCOM Conference Proceed.,* Paper 19.6.1, 1989.

SD12. Bundy, T. J., DiFazio, R. A., Koo, C. S., and Torre, F. M., "Low Probability of Intercept Advanced Technology Demonstration," 1995 IEEE Military Communication Conference (MILCOM '95), Paper C11.2 (classified volume)

SD13. Reed, D. E. and Wickert, M. A., "Minimization of Detection of Symbol-Rate Spectral Lines by Delay and Multiply Receivers," *IEEE Trans. on Comm.,* vol. 36, no. 1, January 1988.

SD14. Reed, D. E. and Wickert, M. A., "Spread Spectrum Signals with Low Probability of Chip Rate Detection," *IEEE Journal on Selected Areas in Communications,* vol. 7, no. 4, May 1989, pp. 595–601.

SD15. Bello, P. A., "Defeat of Feature Detection by Linear Filtering for Direct Sequence Spread Spectrum Communications," MITRE Technical Report, MTR 10660, Bedford, Mass., March 1989.

SD16. "Communications Technology for C31," LPI Study Final Report for Air Force Contract F30602-87-D-0184, Task Order No. 1 Prepared for Rome Air Development Center, Directorate of Communications, by SAIC, Hazeltine Corp., and GT-Tech Inc, July 1989.

SD17. Atlantic Aerospace Electronics Corporation, "Application of Wavelets to the ACIA LPI/AJ Radio," Final Report, June 26, 1998.

SD18. Atlantic Aerospace Electronics Corporation, "SUOSAS Phase 1 Wavelet Transform Domain Communications Enabling Technology," Final Report, Aug. 31, 1998.

SD19. Atlantic Aerospace Electronics Corporation, "SUOSAS Phase 2 Wavelet Transform Domain Communications Enabling Technology," Final Report, Feb. 26, 1998.

We claim:

1. A system for data transfer, comprising:

a covering module configured and arranged to receive a first stream of data at a first input port and a second stream of data at a second input port, to cover the first and second streams of data, and to output a signal having two orthogonal components and carrying the covered data, and an uncovering module configured and arranged to receive the signal carrying the covered data and to uncover the first and second streams of data, wherein a complex amplitude of the signal has substantially Gaussian statistics, and wherein the uncovering module is a linear time-invariant system.

2. A system according to claim 1, wherein the covering module is a linear time-invariant system.

3. A system according to claim 1, wherein the covering module comprises a plurality of filters, and wherein the uncovering module comprises a corresponding plurality of filters, each of the plurality of filters in the uncovering module being a matched filter to a corresponding one of the plurality of filter in the covering module.

4. A system according to claim 1, wherein each among the first and second streams of data is real-valued.

5. A system according to claim 1, wherein the covering module has a first output port and a second output port, each output port configured and arranged to output one of the two orthogonal components, wherein each of the orthogonal components is real-valued and is based at least in part on both the first and second streams of data.

6. A system according to claim 5, wherein one of the two orthogonal components is modulated onto an in-phase carrier component, and the other of the two orthogonal components is modulated onto a quadrature carrier component.

7. A system according to claim 3, wherein at least one pair among the plurality of filters in the covering module comprises a power-complementary filter pair.

8. A system according to claim 1, wherein the signal is transmitted over a wireless channel.

9. A system according to claim 1, wherein the uncovering module has two input ports, each configured and arranged to receive one of the orthogonal components, wherein each of the orthogonal components is real-valued and is based at least in part on both the first and second streams of data.

10. A system according to claim 1, wherein the uncovering module has two output ports, each configured and arranged to output a corresponding uncovered signal, wherein each uncovered signal is real-valued and is based at least in part on a corresponding stream of data.

11. A system according to claim 1, wherein a transfer function of at least one among the covering and uncovering modules comprises a paraunitary matrix of transfer functions.

12. A system according to claim 1, wherein at least one among the covering and uncovering modules comprises a structurally lossless filter.

13. A system according to claim 1, wherein a transfer function of at least one among the covering and uncovering modules has the property of even-shift orthogonality.

14. A system according to claim 1, wherein at least one among the covering and uncovering modules comprises a filter derived from wavelet functions.

15. A system according to claim 1, wherein a transfer function of at least one among the covering and uncovering modules is determined by randomly selected coefficients.

16. A system according to claim 1, said system further comprising a local oscillator and a second uncovering module configured and arranged to receive the two orthogonal components of the signal, wherein a receiver including said uncovering module, said second uncovering module, and said local oscillator is configured and arranged to receive a radio-frequency carrier upon which the signal is modulated, and wherein the output of the uncovering module and an output of the second uncovering module are used to derive an estimated offset between a phase angle of the radio-frequency carrier and a phase angle of the local oscillator.

17. A system according to claim 16, wherein compensation for the estimated offset is performed by combining at least an output of the uncovering module and an output of the second uncovering module.

18. A system according to claim 1, wherein the covering module comprises:

a plurality of lattice sections, each lattice section being assigned a different number from 1 to N and having first and second input ports and first and second output ports, and a plurality of delay elements, each delay element being assigned a different number from 1 to N−1, wherein the first output port of the i-th lattice section is coupled to the first input port of the (i+1)-th lattice section for i from 1 to N−1, and wherein the second output port of the j-th lattice section is coupled to the j-th delay element for j from 1 to N−1, and wherein the second input port of the (k+1)-th lattice section is coupled to the k-th delay element for k from 1 to N−1.

19. A system according to claim 18, wherein the uncovering module comprises:

a plurality of lattice sections, each lattice section being assigned a different number from 1 to N and having first and second input ports and first and second output ports, and a plurality of delay elements, each delay element being assigned a different number from 1 to N−1, wherein the first output port of the m-th lattice section is coupled to the first input port of the (m+1)-th lattice section for m from 1 to N−1, and wherein the second output port of the n-th lattice section is coupled to the n-th delay element for n from 1 to N−1, and wherein the second input port of the (p+1)-th lattice section is coupled to the p-th delay element for p from 1 to N−1.

20. A system according to claim 18, wherein for each lattice section, a relation between a quantity appearing at the two output ports and a quantity applied to the two input ports comprises a rotation according to a predetermined angle.

21. A system according to claim 20, wherein the predetermined angle corresponding to each lattice section is selected according to a substantially random sequence.

22. A system according to claim 20, wherein a transfer function of the covering module is determined by a code vector, the elements of the code vector comprising a sequence of the angles corresponding to each of the plurality of lattice sections in the covering module.

23. A system according to claim 20, wherein at least one among the predetermined angles is chosen to be 0, $\pi/2$, $\pi$, or $3\pi/2$ radians.

24. A system according to claim 20, wherein a tangent of at least one among the predetermined angles is an integer power of two.

25. A system according to claim 18, wherein the multiplication coefficients of the individual lattice sections are selected according to a substantially random sequence.

26. A system according to claim 25, wherein a code vector determines a transfer function of the covering module, the code vector comprising the multiplication coefficients.

27. A system according to claim 1, wherein the covering module contains four finite-impulse-response filters, each having an input port and an output port, the input port configured and arranged to receive a real-valued signal and the output port configured and arranged to output a real-valued signal.

28. A system according to claim 27, wherein the uncovering module contains four finite-impulse-response filters, each having an input port and an output port, the input port configured and arranged to receive a real-valued signal and the output port configured and arranged to output a real-valued signal.

29. A system according to claim 27, wherein the multiplication coefficients of the finite-impulse-response filters of the covering module are selected to correspond to a predetermined sequence of rotation angles.

30. A system according to claim 27, wherein the multiplication coefficients of the finite-impulse-response filters of the covering module are selected according to a substantially random sequence.

31. A system according to claim 27, wherein the multiplication coefficients of the finite-impulse-response filters of the covering module are selected from the group consisting of 0, +1, and −1.

32. A system according to claim 1, wherein the covering module comprises two infinite-impulse-response filters.

33. A system according to claim 32, wherein each infinite-impulse-response filter has an input port and an output port, the input port configured and arranged to receive a real-valued signal and the output port configured and arranged to output a real-valued signal.

34. A system according to claim 32, wherein each infinite-impulse-response filter comprises a cascade of all-pass sections.

35. A system according to claim 32, wherein each infinite-impulse-response filter comprises:

a plurality of lattice sections, each lattice section being assigned a different number from 1 to N and having first and second input ports and first and second output ports, and a plurality of delay elements, each delay element being assigned a different number from 1 to N, wherein the first output port of the i-th lattice section is coupled to the first input port of the (i+1)-th lattice section for i from 1 to N−1, and wherein the second output port of the (j+1)-th lattice section is coupled to the j-th delay element for j from 1 to N−1, and wherein the second input port of the k-th lattice section is coupled to the k-th delay element for k from 1 to N, and wherein the first output port of the N-th lattice section is coupled to the N-th delay element.

36. A system according to claim 35, wherein each infinite-impulse-response filter comprises a cascade of all-pass sections, and wherein a code vector comprises the multiplication coefficients for the all-pass sections.

37. A system for data transfer, comprising:

a covering module configured and arranged to receive a first stream of data at a first input port and a second stream of data at a second input port, to cover the first and second streams of data, and to output a signal having two orthogonal components and carrying the covered data, and an uncovering module configured and arranged to receive the signal carrying the covered data and to uncover the first and second streams of data, wherein each of the two orthogonal components of the signal is a function of at least both of the first and second streams of data to be transferred, and wherein the uncovering module is a linear time-invariant system.

38. A system according to claim 37, wherein the covering module is configured and arranged to output a signal having a complex amplitude with substantially Gaussian statistics in response to input streams of data that are based at least in part on uncorrelated binary pseudonoise sequences.

39. A system according to claim 38, wherein one of the two orthogonal components is modulated onto an in-phase carrier component, and the other of the two orthogonal components is modulated onto a quadrature carrier component.

40. A system according to claim 39, wherein the signal is transmitted over a wireless channel.

41. A system according to claim 37, wherein one of the two orthogonal components is modulated onto an in-phase carrier component, and the other of the two orthogonal components is modulated onto a quadrature carrier component.

42. A system according to claim 41, wherein the signal is transmitted over a wireless channel.

43. A system for data transfer, comprising:

a covering module configured and arranged to receive a first stream of data at a first input port and a second stream of data at a second input port, to cover the first and second streams of data, and to output a signal having two components and carrying the covered data, and an uncovering module configured and arranged to receive the signal carrying the covered data and to uncover the first and second streams of data, wherein each of the two components of the signal carrying the covered data is a different function of both of the first and second streams of data, and wherein the covering module comprises a plurality of filters, each configured and arranged to receive at least a portion of the data to be transferred and to output a filtered signal comprising frequency components, and wherein a sampling rate of the data to be transferred defines a sampling bandwidth of the system, and wherein a magnitude of the frequency response of each of the plurality of filters comprises peaks, the peaks being distributed across substantially the entire range of the sampling bandwidth of the system.

44. A system for data transfer, comprising:

a covering module configured and arranged to receive a first stream of data at a first input port and a second stream of data at a second input port, to cover the first and second streams of data, and to output a signal having two components and carrying the covered data, and an uncovering module configured and arranged to receive the signal carrying the covered data and to uncover the first and second streams of data, wherein each of the two components of the signal is a different function of both of the first and second streams of data, and wherein the uncovering module is a linear time-invariant system.

45. A system for data transfer, comprising:

a covering module configured and arranged to receive a first stream of data at a first input port and a second stream of data at a second input port, to cover the first and second streams of data, and to output a signal having two orthogonal components and carrying the covered data, and an uncovering module configured and arranged to receive the signal carrying the covered data and to uncover the first and second streams of data, wherein the covering module comprises a plurality of filters, each configured and arranged to receive at least a portion of the data to be transferred and to output a filtered signal comprising frequency components, and wherein a sampling rate of the data to be transferred defines a sampling bandwidth of the system, and wherein a magnitude of the frequency response of each of the plurality of filters comprises peaks, the peaks being distributed across substantially the entire range of the sampling bandwidth of the system.

46. A system for data transfer, comprising:

a covering module configured and arranged to receive a first stream of data at a first input port and a second stream of data at a second input port, to cover the first and second streams of data, and to output a signal having two orthogonal components and carrying the covered data, and an uncovering module configured and arranged to receive the signal carrying the covered data and to uncover the first and second streams of data, wherein the signal has a flat power spectrum, and wherein the uncovering module is a linear time-invariant system.

47. A system for data transfer, comprising:

a covering module configured and arranged to receive a first stream of data at a first input port and a second stream of data at a second input port, to cover the first and second streams of data, and to output a signal having two orthogonal components and carrying the covered data, and an uncovering module configured and arranged to receive the signal carrying the covered data and to uncover the first and second streams of data, wherein a transfer function of the covering module and a transfer function of the uncovering module are determined by a code vector, and wherein the uncovering module is a linear time-invariant system.

* * * * *